United States Patent
Yamaguchi

(10) Patent No.: US 7,904,896 B2
(45) Date of Patent: Mar. 8, 2011

(54) PROGRAM REWRITING SYSTEM, BOOT LOADER, STORAGE MEDIUM, AND ELECTRONIC CONTROL UNIT

(75) Inventor: Makoto Yamaguchi, Okazaki (JP)

(73) Assignee: Denso Corporation, Kariya (JP)

( * ) Notice: Subject to any disclaimer, the term of this patent is extended or adjusted under 35 U.S.C. 154(b) by 1160 days.

(21) Appl. No.: 11/298,574

(22) Filed: Dec. 12, 2005

(65) Prior Publication Data
US 2006/0155941 A1    Jul. 13, 2006

(30) Foreign Application Priority Data
Dec. 10, 2004    (JP) ................................. 2004-358974

(51) Int. Cl.
G06F 9/44      (2006.01)
G06F 9/445     (2006.01)
G06F 12/00     (2006.01)
G06F 13/00     (2006.01)
G06F 13/28     (2006.01)

(52) U.S. Cl. ......... 717/168; 717/169; 717/174; 717/175; 717/177; 711/103; 711/164

(58) Field of Classification Search .................. 711/154, 711/103, 164; 717/168, 174, 169, 175, 177
See application file for complete search history.

(56) References Cited

U.S. PATENT DOCUMENTS

| 5,844,796 | A  | * | 12/1998 | Araki  | 700/86  |
|-----------|----|---|---------|--------|---------|
| 5,963,979 | A  | * | 10/1999 | Inoue  | 711/162 |
| 6,249,848 | B1 | * | 6/2001  | Terada et al. | 711/154 |
| 6,275,911 | B1 | * | 8/2001  | Terada et al. | 711/154 |
| 6,477,626 | B1 | * | 11/2002 | Terada et al. | 711/154 |
| 6,505,280 | B2 | * | 1/2003  | Terada et al. | 711/164 |
| 6,957,296 | B2 | * | 10/2005 | Terada et al. | 711/103 |
| 7,493,455 | B2 | * | 2/2009  | Terada et al. | 711/154 |
| 2001/0032289 | A1 | * | 10/2001 | Terada et al. | 711/103 |
| 2002/0099905 | A1 | * | 7/2002 | Terada et al. | 711/103 |

(Continued)

FOREIGN PATENT DOCUMENTS
JP    H05-324305    12/1993
(Continued)

OTHER PUBLICATIONS

Office Action dated Apr. 6, 2010 issued in corresponding Japanese Application No. 2004-358974 with an at least partial English-language translation thereof.

*Primary Examiner* — Emerson C Puente
*Assistant Examiner* — Charles Swift
(74) *Attorney, Agent, or Firm* — Nixon & Vanderhye P.C.

(57) ABSTRACT

A system is communicably coupled to an external device at least when rewriting, at least in a module, a first application program stored in a first memory of the system into a second application program stored in the external device. In the system, a receiving unit is configured to receive an identifier sent from the external device. The identifier decides a sending timing of the second application program from the external device. In the system, an identification unit is configured to identify that write target data sent from the external device is at least a module of the second application program after the identifier is received by the receiving unit.

16 Claims, 12 Drawing Sheets

U.S. PATENT DOCUMENTS

| | | | |
|---|---|---|---|
| 2003/0041217 A1* | 2/2003 | Terada et al. | 711/154 |
| 2003/0051011 A1* | 3/2003 | Schacht et al. | 709/221 |
| 2004/0068662 A1* | 4/2004 | Ho et al. | 713/200 |
| 2004/0143828 A1* | 7/2004 | Liu et al. | 717/168 |
| 2004/0215755 A1* | 10/2004 | O'Neill | 709/223 |
| 2004/0230963 A1* | 11/2004 | Rothman et al. | 717/168 |

FOREIGN PATENT DOCUMENTS

| | | |
|---|---|---|
| JP | H09-134307 | 5/1997 |
| JP | H10-105468 | 4/1998 |
| JP | 2000-076061 | 3/2000 |
| JP | 2004-348178 | 12/2004 |

* cited by examiner

PROGRAM REWRITING SYSTEM, BOOT LOADER, STORAGE MEDIUM, AND ELECTRONIC CONTROL UNIT

CROSS REFERENCE TO RELATED APPLICATION

This application is based on Japanese Patent Application 2004-358974 filed on Dec. 10, 2004. The descriptions of the Patent Application are therefore all incorporated herein by reference.

BACKGROUND OF THE INVENTION

1. Field of the Invention

The present invention relates to techniques for rewriting application programs while they are being mounted on/in a circuit board installed in an electronic control unit (ECU); these application programs are executable by a computer of the ECU. The electronic control unit will be abbreviated as ECU hereinafter.

2. Description of the Related Art

ECUs, which are preferably installed in an automobile and operative to control a target, such as an engine installed therein, have been well known, one example of which is disclosed in Japanese Unexamined Patent Publication No. H10-105468. In the ECU disclosed in the Publication, an application program for controlling a target(s) has been stored in a nonvolatile rewritable memory, such as a flash ROM (Reed Only Memory), EEPROM (Electrical Erasable Programmable Rom), or the like. The nonvolatile rewritable memory has been mounted, as a component of a computer, on/in a circuit board of the ECU. The computer of the ECU is operative to rewrite the application program in the nonvolatile rewritable memory without removing it from the circuit board of the ECU.

In such an ECU, when rewriting an earlier application program in a rewritable memory, first, an external device, such as a computer device, is prepared to be communicably connected to the ECU through a communication line. Next, a write request is sent from the external device to a computer of the ECU through the communication line as a command; this write request allows the computer to shift its operation mode into a mode (application program rewritable mode) in which the computer can rewrite application programs stored in the rewritable memory. Note that the write request can be transmitted from the external device to the ECU through a signal line different from the communication line.

After transmission of the write request, a rewrite control program is sent from the external device to the computer of the ECU; the rewrite control program is designed to cause a computer to:

receive a new application program sent from the external device; and update the earlier application program to the received new application program.

Specifically, after sending of the rewrite control program, the new application program is sent from the external device to the computer of the ECU.

On the other hand, when receiving the write request, the computer of the ECU runs a boot loader (boot program) previously stored in the nonvolatile rewritable memory thereof. The boot loader causes the computer to:

receive the rewrite control program to download it in a RAM (Random Access Memory) of the computer; and launch the rewrite control program stored in the RAM.

Specifically, as the launching process, the boot loader causes the execution location of the computer to jump to the leading address of the rewrite control program in the RAM. After jump of the computer's execution location, the computer executes the rewrite control program in the RAM to receive the new application program transferred from the external device, thereby updating the earlier application program to the received new application program in the rewritable memory.

These application-program rewriting operations set forth above are disclosed in the aforementioned Unexamined Patent Publication.

Specifically, these application-program rewriting operations allow the earlier application program to be rewritten into the new application program in the rewritable memory. For example, an earlier version of the application program can be updated to a new version thereof in the rewritable memory.

When no application programs to be updated has been stored in the rewritable memory, the new application program sent from the external device is stored in the rewritable memory.

In the Unexamined Patent Publication, the rewrite control program and the new application program have been stored in the external device as different files. The boot loader to be executed by the computer of the ECU serves as download of the rewrite control program into the RAM, and jump of the execution location of the computer to the leading address of the rewrite control program.

Such external devices for rewriting application programs in, for example, automobile field use any one of typically three different application-program sending ways (programs, procedures) A to C. A, B, and C types of external devices employ the application-program sending ways A, B and C, respectively.

Specifically, the A type of external devices is configured to have stored therein a rewrite control program and a new application program in different files.

The B type of external devices is configured to have stored therein a rewrite control program and a new application program in the same single file.

The C type of external devices is configured to have stored therein a new application program without storing a rewrite control program. This is because the C type of external devices is designed on the understanding that the rewrite control program has been stored in a nonvolatile memory of a computer of the ECU.

In order to rewrite an earlier application program stored in the ECU, in an external device of the A type, the rewrite control program and the new application program are separately sent from the external device of the A type to the ECU.

In contrast, in an external device of the B type, the rewrite control program and the new application program have been stored in the same single file, so that, in order to rewrite an earlier application program stored in the ECU, they are sent from the external device of the B type to the ECU in file. For this reason, the boot loader being executed by the computer of the ECU does not cause the computer to identify the end address of the rewrite control program. This results in that download of the rewrite control program into the RAM may come to nothing, making it difficult to accurately update the earlier application program.

In addition, because no rewrite control program is sent from an external device of the C type to the ECU, the boot loader being executed by the computer of the ECU may cause the computer to erroneously download the new application program sent from the external device of the C type into the RAM as the rewrite control program. This may also make it difficult to accurately update the earlier application program.

It may be considered that boot loaders (boot programs) are designed exclusively for the types A, B, and C of external devices. This may cause the number of processes for developing the dedicated boot loaders for the types A to C of external devices to increase. In addition, it may be necessary to select one of the boot loaders to match any one of the types of an external device used, causing management of the dedicated boot loaders and the external devices of the types A to C to become complicated.

If one of the boot loaders, which does not match the type of an external device used, is installed in the computer of the ECU, earlier application programs, which have been already installed in the computer of the ECU, cannot be updated to new ones.

SUMMARY OF THE INVENTION

The present invention has been made on the background set forth above. Specifically, at least one preferable embodiment of the present invention provides a program rewriting system and an electronic control unit, which are capable of meeting any different application-program sending ways employed by external devices.

According to a first aspect of the present invention, there is provided a system communicably coupled to an external device at least when rewriting, at least in a module, a first application program stored in a first memory of the system into a second application program stored in the external device. The external device is configured to send, to the system, the second application program based on first and second different ways. The first way is to send, to the system, a rewrite control program stored in the external device as write target data, and the second application program next to the rewrite control program as the write target data. The second way is to send, to the system, the second application program as the write target data without sending the rewrite control program. The rewrite control program allows the system to rewrite the first application program into the second application program. The system includes a receiving unit configured to receive an identifier sent from the external device. The identifier decides a sending timing of the second application program from the external device. The system also includes an identification unit configured to identify that the write target data sent from the external device is at least a module of the second application program after the identifier is received by the receiving unit.

According to a second aspect of the present invention, there is provided a system communicably coupled to an external device at least when rewriting, at least in a module, a first application program stored in a first memory of the system into a second application program stored in the external device. The external device is configured to send, to the system, the second application program based on first and second different ways. The first way is to send, to the system, a rewrite control program stored in the external device as write target data, and the second application program next to the rewrite control program as the write target data. The second way is to send, to the system, the second application program as the write target data without sending the rewrite control program. The rewrite control program allows the system to rewrite the first application program into the second application program. The system includes a determining unit configured to determine whether to receive an identifier sent from the external device. The identifier decides a sending timing of the second application program from the external device. The system also includes a first identification unit configured to identify that the write target data sent from the external device is at least a module of the rewrite control program until it is determined that the identifier is received. The system further includes a second identification unit configured to identify that the write target data sent from the external device is at least a module of the second application program after it is determined that the identifier is received.

According to a third aspect of the present invention, there is provided a program product having a boot loader installed in a system. The system is communicably coupled to an external device at least when rewriting, at least in a module, a first application program stored in a first memory of the system into a second application program stored in the external device. The external device is configured to send, to the system, the second application program based on first and second different ways. The first way is to send, to the system, a rewrite control program stored in the external device as write target data, and the second application program next to the rewrite control program as the write target data. The second way is to send, to the system, the second application program as the write target data without sending the rewrite control program. The rewrite control program allows the system to rewrite the first application program into the second application program. The boot loader includes first means for instructing a computer to determine whether to receive an identifier sent from the external device. The identifier decides a sending timing of the second application program from the external device. The boot loader also includes second means for instructing a computer to identify that the write target data sent from the external device is at least a module of the rewrite control program until it is determined that no identifier is received. The boot loader further includes third means for instructing a computer to identify that the write target data sent from the external device is at least a module of the second application program after it is determined that the identifier is received.

According to a fourth aspect of the present invention, there is provided a signal bearing media bearing the boot loader according to the third aspect of the present invention.

According to a fifth aspect of the present invention, there is provided a vehicle control unit for controlling a target installed in a vehicle. The vehicle control unit includes a computer and the signal bearing media according to the third aspect of the present invention. The signal bearing media is readable by the computer.

According to a sixth aspect of the present invention, there is provided a system communicably coupled to an external device at least when rewriting, at least in a module, a first application program stored in a first memory of the system into a second application program stored in the external device. The external device is configured to send, to the system, the second application program based on first and second different ways. The first way is to send, to the system, a rewrite control program stored in the external device as write target data, and the second application program next to the rewrite control program as the write target data. The second way is to send, to the system, the second application program as the write target data without sending the rewrite control program. The rewrite control program allows the system to rewrite the first application program into the second application program. The system includes a receiving unit configured to receive destination information sent from the external device. The destination information indicates an address at which the write target data is written. The system also includes a determining unit configured to determine whether the destination information indicates an address in the first memory. The system further includes an identification unit configured to identify that the write target data sent from the external device is at least a module of the second application program after it is determined that the destination information indicates an address in the first memory.

According to a seventh aspect of the present invention, there is provided a system communicably coupled to an external device at least when rewriting, at least in a module, a first application program stored in a first memory of the system into a second application program stored in the external device. The external device is configured to send, to the system, the second application program based on first and second different ways. The first way is to send, to the system, a rewrite control program stored in the external device as write target data, and the second application program next to the rewrite control program as the write target data. The second way is to send, to the system, the second application program as the write target data without sending the rewrite control program. The rewrite control program allows the system to rewrite the first application program into the second application program. The system includes a receiving unit configured to receive destination information sent from the external device. The destination information indicates an address at which the write target data is written. The system also includes a determining unit configured to determine whether the destination information indicates an address in the first memory. The system further includes a first identification unit configured to identify that the write target data sent from the external device is at least a module of the rewrite control program until it is determined that the destination information indicates an address in the first memory. The system still further includes a second identification unit configured to identify that the write target data sent from the external device is at least a module of the second application program after the it is determined that the destination information indicates an address in the first memory.

According to an eighth aspect of the present invention, there is provided a program product having a boot loader installed in a system. the system is communicably coupled to an external device at least when rewriting, at least in a module, a first application program stored in a first memory of the system into a second application program stored in the external device. The external device is configured to send, to the system, the second application program based on first and second different ways. The first way is to send, to the system, a rewrite control program stored in the external device as write target data, and the second application program next to the rewrite control program as the write target data. The second way is to send, to the system, the second application program as the write target data without sending the rewrite control program. The rewrite control program allows the system to rewrite the first application program into the second application program. The boot loader includes first means for instructing a computer to determine whether the destination information indicates an address in the first memory. The boot loader also includes second means for instructing a computer to identify that the write target data sent from the external device is at least a module of the rewrite control program until it is determined that the destination information indicates an address in the first memory. The boot loader includes third means for instructing a computer to identify that the write target data sent from the external device is at least a module of the second application program after the it is determined that the destination information indicates an address in the first memory.

According to a ninth aspect of the present invention, there is provided a signal bearing media bearing the boot loader according to the eighth embodiment.

According to a tenth aspect of the present invention, there is provided a vehicle control unit for controlling a target installed in a vehicle. The vehicle control unit includes a computer and the signal bearing media according to the eighth aspect of the present invention; this signal bearing media is readable by the computer.

BRIEF DESCRIPTION OF THE DRAWINGS

Other objects and aspects of the invention will become apparent from the following description of an embodiment with reference to the accompanying drawings in which.

DETAILED DESCRIPTION OF EMBODIMENTS OF THE INVENTION

Embodiments of the present invention will be described hereinafter with reference to the attached figures.

First Embodiment

Figure 1:
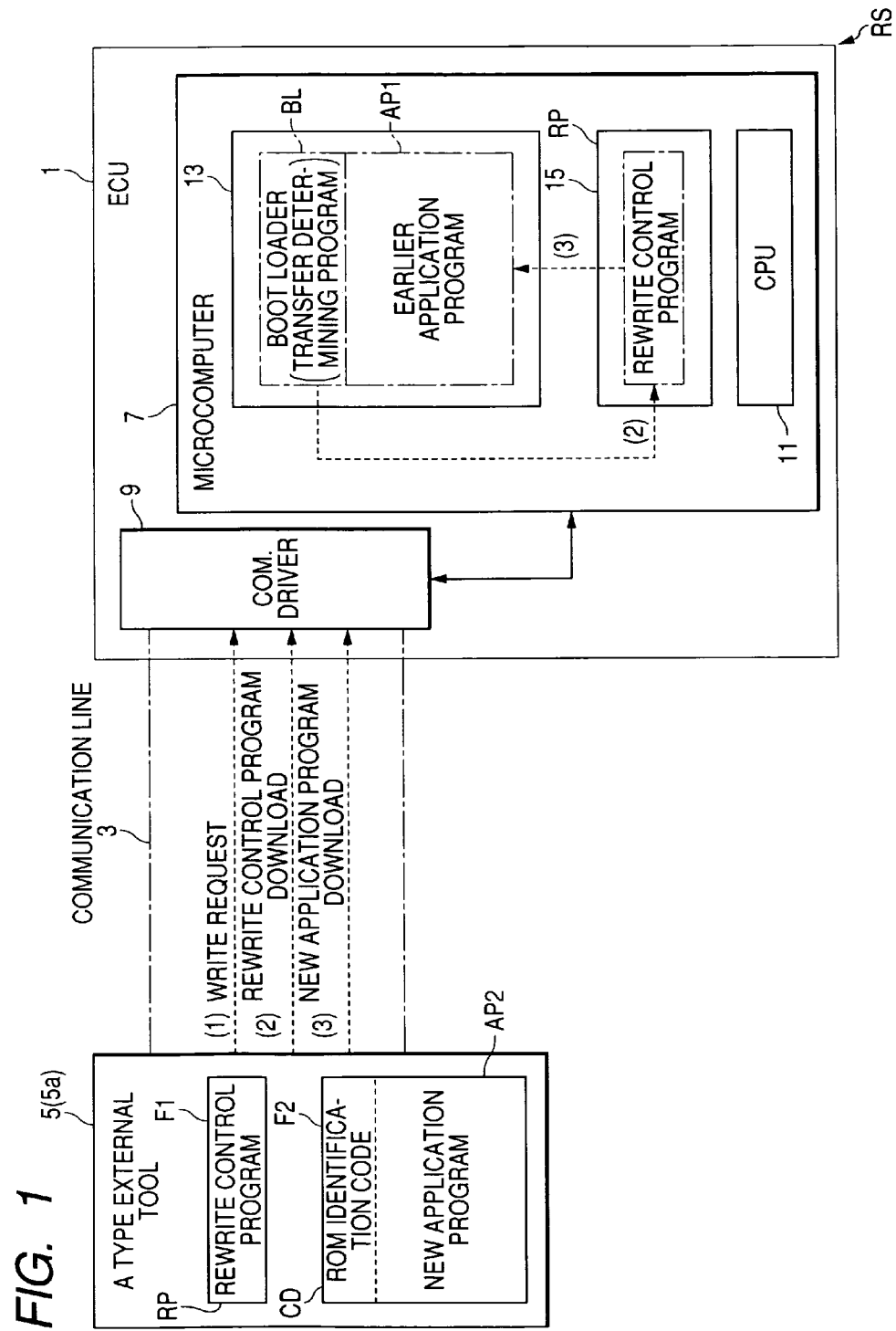
FIG. 1 is a block diagram schematically illustrating an example of the hardware structure of a program rewritable system with an A type external tool according to a first embodiment of the present invention.

Referring to FIG. 1, a program rewriting system RS according to the first embodiment includes an ECU 1 preferably installed in an automobile and operative to control a target, such as an engine installed therein. The program rewriting system RS also includes an external tool 5, such as an external device consists of a computer-implemented communication device. At least when rewriting an earlier application program, which has been stored in the ECU 1, communication between the external tool 5 and the ECU 1 through a communication line 3 is established.

The ECU 1 includes a microcomputer 7 and a communication driver 9 for allowing the microcomputer 7 to communicate with the external tool 5 through the communication line 3. The microcomputer 7 includes a CPU 11 operative to run programs, a flash ROM 13 as an example of nonvolatile rewritable memories, and a RAM 15 as an example of volatile memories, which serves as a main working memory of the microcomputer 7. For example, the elements of the microcomputer 7 are mounted on/in a circuit board of the ECU 1.

The flash ROM 13 has stored therein an earlier application program AP1 and a boot loader BL. The boot loader BL causes the CPU 11 to, when a write request is sent from the external tool 5 to the microcomputer 7, launch a rewrite control program RP, described hereinafter, stored in the RAM 15. The write request allows the CPU 11 to shift its operation mode into a mode in which the CPU 11 can rewrite application programs stored in the flash ROM 13. The rewrite control program causes the CPU 11 to update the earlier application program AP1 to a new application program. The boot loader BL can be stored in a ROM of the microcomputer 7. In addition, the write request is configured to be sent from the external tool 5 to the ECU 1 when a predetermined operation is executed in the external tool 5.

In the first embodiment, as the external tool 5, any one of three types A, B, and C of external tools 5a to 5c can be used. The three types A to C of external tools 5a to 5c employ application-program sending ways A to C, respectively.

Specifically, the A type external tool 5a is configured to have stored therein the rewrite control program RP and a new application program AP2 in different files F1 and F2 (see FIG. 1).

Figure 2:
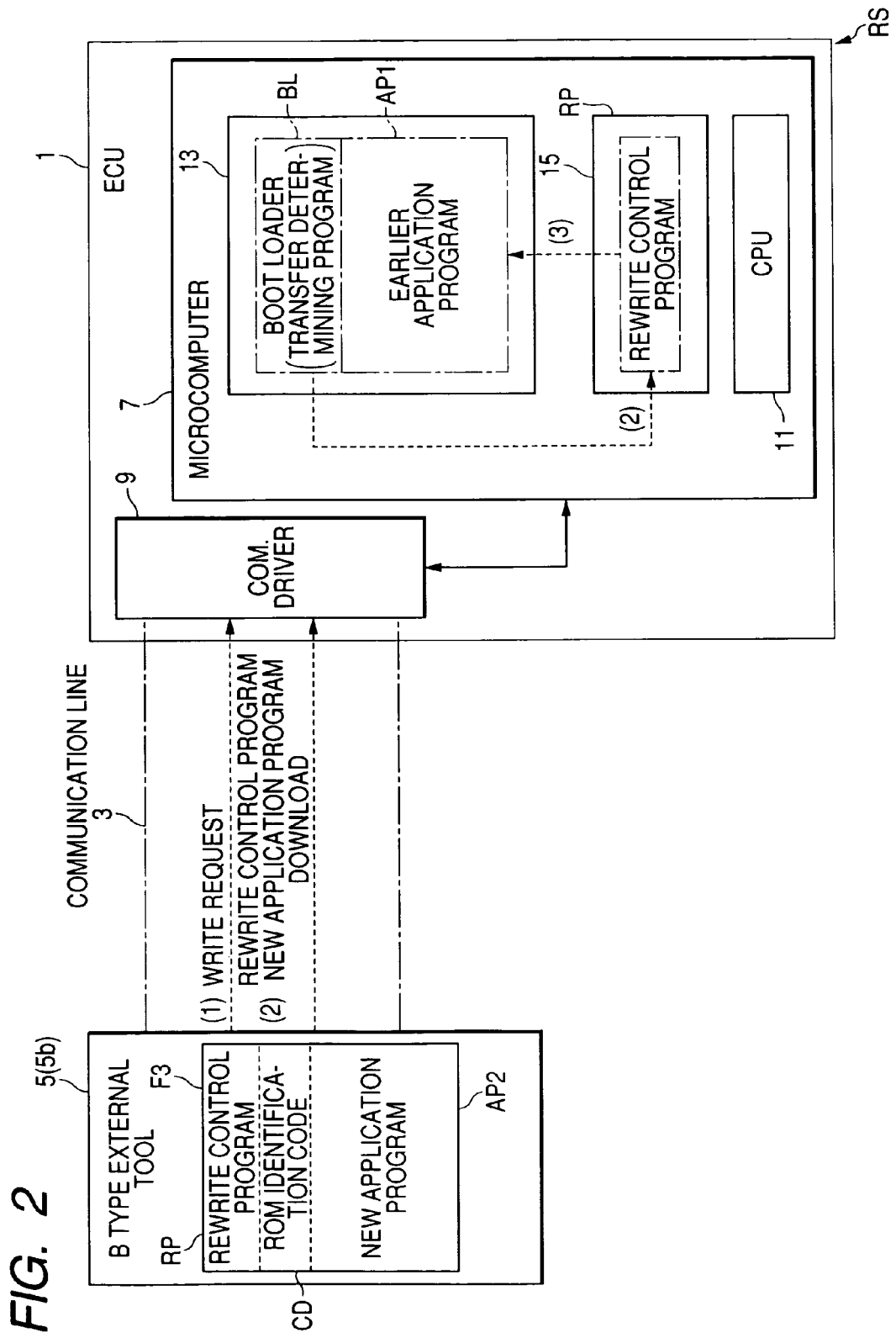
FIG. 2 is a block diagram schematically illustrating an example of the hardware structure of a program rewritable system with a B type external tool according to a first embodiment of the present invention.

The B type external tool 5b is configured to have stored therein the rewrite control program RP and the new application program AP2 in the same single file F3 (see FIG. 2).

The C type external tool 5c is configured to have stored therein the new application program AP2 as a file F2 without storing the rewrite control program RP. This is because the C type external tool 5c is designed on the understanding that the rewrite control program RP has been stored in the microcomputer 7 of the ECU 1.

Figure 3:
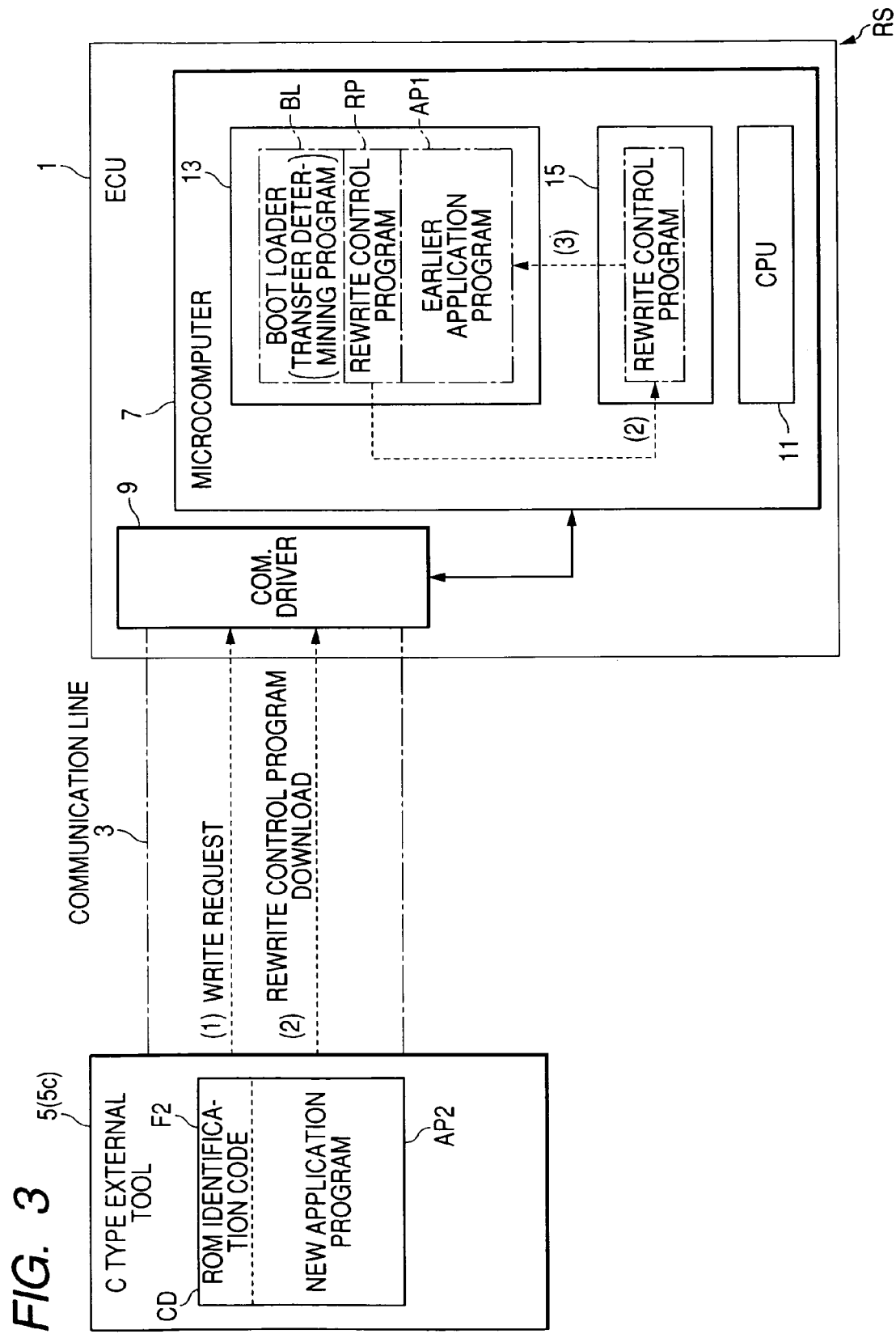
FIG. 3 is a block diagram schematically illustrating an example of the hardware structure of a program rewritable system with a C type external tool according to a first embodiment of the present invention.

As illustrated in FIGS. 1 and 3, for example, a ROM identification code CD is located at the top (beginning) of the whole data (information) stored in the file F2; this ROM identification code CD allows the CPU 11 to identify that the following data (information) from the identification code CD is a new application program. Each of the external tools 5a and 5c is therefore operative to send the ROM identification code CD to the ECU 1 before sending the new application program AP2.

Similarly, as illustrated in FIG. 2, for example, the ROM identification code CD is located at the boundary between the rewrite control program RP and the new application program AP2; this ROM identification code CD allows the CPU 11 to identify that the following data (information) from the identification code CD is a new application program. The external tool 5b is therefore operative to send the ROM identification code CD to the ECU 1 before sending the new application program AP2.

Each of the external tools 5a to 5c is configured to sequentially send, to the ECU 1 through the communication line 3, data in a predetermined unit quantity of data, such as in 2 bytes.

Specifically, when the ECU 1 has a function capable of communicating with the C type of external tools, the ECU 1 has stored the rewrite control program RP in the flash ROM 13 at a predetermined first address area thereof. Note that the rewrite control program RP can have been stored in another nonvolatile memory, such as a ROM of the microcomputer 7.

Next, operations of each of the external tools 5a to 5c and of the ECU 1 will be described hereinafter when rewriting the earlier application program AP1.

Independently of which external tool is ready to communicate with the ECU 1, when the write request is sent from any one of the external tools 5a to 5c to the ECU 1, the CPU 11 of the microcomputer 7 shifts its execution location from the earlier application program AP1 in the flash ROM 13 to the leading address of the boot loader BL therein.

Next, as illustrated in FIG. 1, when the A type external tool 5a has sent the write request to the ECU 1, the A type external tool 5a sends the rewrite control program RP (the file F1) to the ECU 1 after sending the write request thereto.

When the rewrite control program RP is sent from the A type external tool 5a, the CPU 11 of the microcomputer 7 runs the boot loader BL. The boot loader B1 causes the CPU 11 to receive the rewrite control program RP to sequentially download it in the RAM 15 from a predetermined address (leading address) thereof. After completion of the rewrite control program download, the boot loader BL causes the CPU 11 to shift its execution location to the leading address of the rewrite control program RP.

After completion of sending the rewrite control program RP, the external tool 5a sends, to the ECU 1, the new application program AP2 (the file F2).

On the other hand, after shift of the CPU's execution location to the leading address of the rewrite control program RP, the CPU 11 runs the rewrite control program RP from the leading address thereof. Specifically, the rewrite control program RP causes the CPU 11 to execute rewrite (update) operations for updating the new application program AP2 sent from the external tool 5a in the flash ROM 13. The rewrite operations permit the earlier application program AP1 stored in the flash ROM 13 is rewritten into the new application program AP2. If no application programs to be updated has been stored in the flash ROM 13, the new application program AP2 sent from the external tool 5a is stored in the flash ROM 13 in a new entry.

As illustrated in FIG. 2, when the B type external tool 5b has sent the write request to the ECU 1, the B type external tool 5b sends the rewrite control program RP and the new application program AP2 (the file F3) to the ECU 1 after sending the write request thereto.

When the file F2 is sent from the B type external tool 5b, the CPU 11 of the microcomputer 7 runs the boot loader BL. The boot loader BL causes the CPU 11 to receive the file F3 (the rewrite control program RP and the new application program AP2) to sequentially download them in the RAM 15 from a predetermined address (leading address) thereof. After completion of the file F3 download, the boot loader BL causes the CPU 11 to shift its execution location to the leading address of the file P3 (rewrite control program RF1.

Subsequently, the CPU 11 runs the rewrite control program RP from the leading address thereof. Specifically, the rewrite control program RP causes the CPU 11 to execute rewrite (update) operations for updating the new application program AP1 sent from the external tool 5a in the flash ROM 13.

On the other hand, as illustrated in FIG. 3, when the C type external tool 5c has sent the write request to the ECU 1, the C type external tool 5*c* sends the new application program AP2 (the file F2) to the ECU 1 after sending the write request thereto.

When the file F2 is sent from the C type external tool 5*c*, the CPU 11 of the microcomputer 7 runs the boot loader BL. The boot loader BL causes the CPU 11 to receive the new application program AF) to sequentially download it in the RAM 15 from a predetermined address (leading address) thereof. After completion of the new application program AP2 download, the boot loader BL causes the CPU 11 to copy the rewrite control program RP previously stored in the flash ROM 13 into the RAM 15 from a predetermined address (leading address) thereof. After completion of the rewrite-control program copy, the boot loader BL causes the CPU 11 to shift its execution location to the leading address of the rewrite control program RP.

Subsequently, the CPU 11 runs the rewrite control program RP from the leading address thereof. Specifically, the rewrite control program RP causes the CPU 11 to execute rewrite (update) operations for updating the new application program AP1 sent from the external tool 5*a* in the flash ROM 13.

Next, the specific instructions (procedures) of the boot loader BL according to the first embodiment will be described hereinafter with reference to FIGS. 4 and 5. Specifically the boot loader BL according to the first embodiment is able to be executed by the ECU 1, to meet any types of external tools 5*a* to 5*c*, and to realize the rewrite operations in cases of using any one of the external tools 5*a* to 5*c*.

Figure 4:
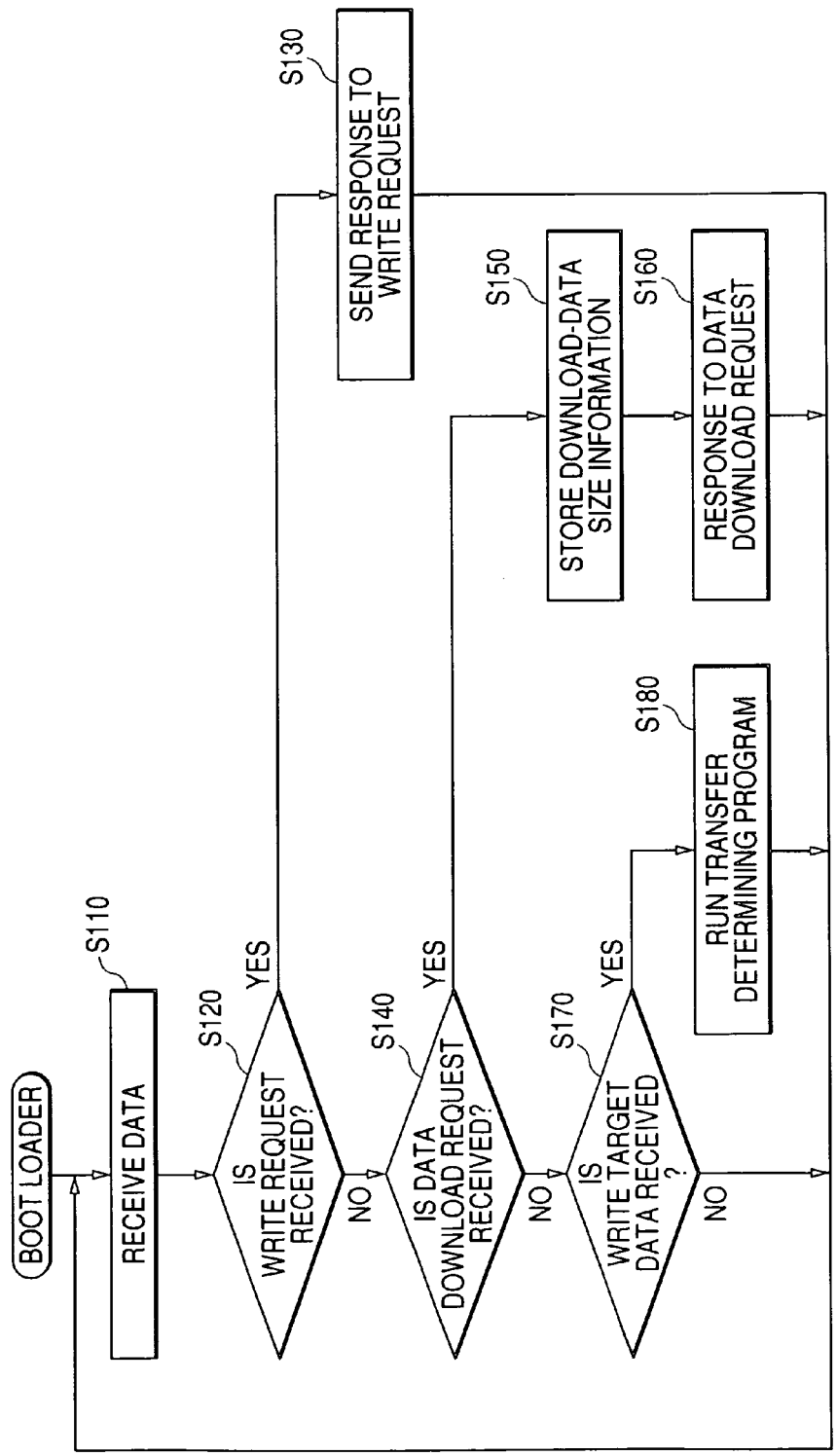
FIG. 4 is a flowchart schematically illustrating the overall procedure of a boot loader according to a first embodiment.

FIG. 4 schematically illustrates the overall procedure of the boot loader BL.

Specifically as set forth above, the CPU 11 of the microcomputer 7 of the ECU 1 shifts its execution location from the earlier application program AP1 to the boot loader BL when the write request is sent from the external tool 5 to the ECU 1. For example, the earlier application program AP1 includes a predetermined procedure to detect that the communication driver 9 receives the write request sent from the external tool 5. As a result, when the CPU 11 executes the predetermined procedure while executing the earlier application program AP1, the CPU 11 executes the procedures of the boot loader BL illustrated in FIG. 4.

When the CPU 11 launches the procedures of the boot loader BL, in step S110, the CPU 11 receives a unit quantity of the data sent from the external tool 5 and received by the communication driver 9. Next, in step S120, the CPU 11 analyzes the received unit quantity of data to determine whether the received unit quantity of data is the write request based on the analyzed result.

If it is determined that the write request has been received (the determination in step S120 is YES), the CPU 11 goes to step S130 to execute an operation required to send, to the external tool 5, a response to the write request, and thereafter returning to the step S110. The response to the write request is a response message indicating, to the external tool 5, that the write request is normally received.

When it is determined that the write request has not been received (the determination in step S120 is NO), the CPU 11 goes to step S140. In step S140, the CPU 11 analyzes the received unit quantity of data in step S110 to determine whether the received unit quantity of data is a data download request based on the analyzed result.

The data download request is a command to indicate, to the ECU 1, that the external tool 5 starts to send data to be written except for commands; this data to be rewritten specifically is the rewrite control program RP or the new application program AP2. The data download request also includes download-data size information indicating the total volume of the data to be written. The data to be written will be referred to as write target data or write data hereinafter.

When it is determined that the data download request has been received (the determination in step S140 is YES), the CPU 11 goes to step S150 to store the download-data size information in the RAM 15. Subsequently, in the next step S160, the CPU 11 executes an operation required to send, to the external tool 5, a response to the data download request, and thereafter returning to the step S110. The response to the data download request is a response message indicating, to the external tool 5, that the data download request is normally received.

When it is determined that the data download request has not been received (the determination in step S140 is NO), the CPU 11 goes to step S170. In step S170, the CPU 11 analyzes the received unit quantity of data in step S110 to determine whether the received unit quantity of data is a part of the write target data based on the analyzed result. Note that, in step S170, it is determined that the ROM identification code CD belongs to the write target data.

When it is determined that the write target data has not been received (the determination in step S170 is NO), the CPU 11 returns to step S110. When it is determined that the write target data has been received (the determination in step S170 is YES), the CPU 11 goes to step S180. In step S180, the CPU 111 executes a transfer determining program, such as a subroutine, illustrated in FIG. 5 hereinafter, and thereafter returns to step S110. The transfer determining program is a part of (a module of) the boot loader BL.

Figure 5:
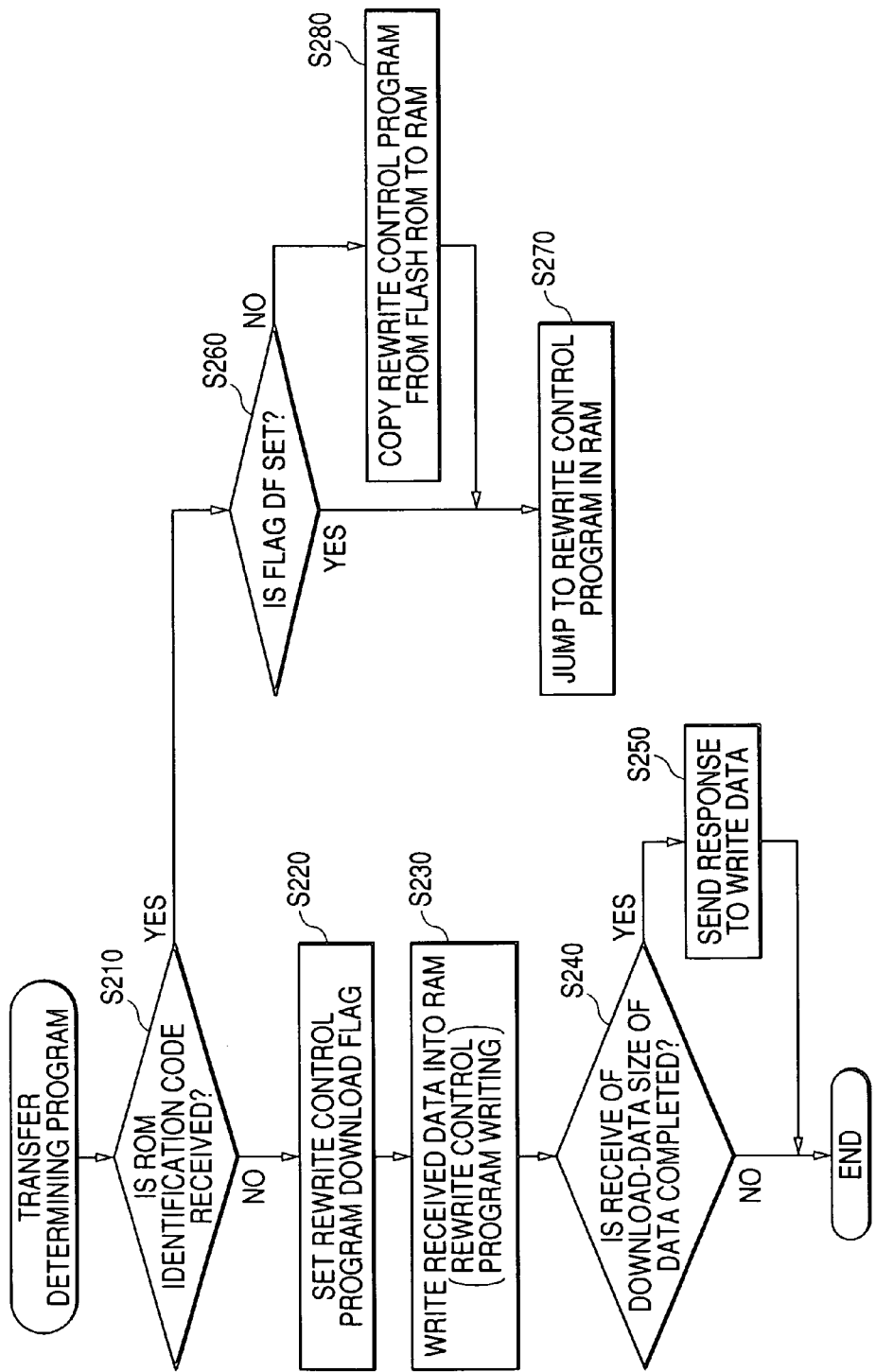
FIG. 5 is a flowchart schematically illustrating an algorithm of a transfer determining program included in the boot loader illustrated in each of FIGS. 1 to 3.

When launching the transfer determining program, the CPU 11 analyzes the received data in step S110 to determine whether the received data is the ROM identification code CD based on the analyzed result in step S210 of FIG. 5.

When it is determined that ROM identification code CD has not been received (the determination in step S210 is NO), the CPU 11 goes to step S220. In step S220, the CPU 11 sets a rewrite control program download flag DF in its register; this flag DF indicates that the download of the rewrite control program RP has been completed. Next, the CPU 11 writes the current received data, that is, the write target data, into the RAM 15 at a predetermined address thereof as data constituting the rewrite control program RP in step S230.

In the next step S240, the CPU 11 determines whether received data volume is equivalent to the total volume indicated by the download-data size information stored in the RAM 15 in step S150. In other words, the CPU 11 determines whether the download-data size of the write target data has been entirely written in the RAM 15 in step S240.

When it is determined that the download-data size of the write target data has not been entirely written in the RAM 15 (the determination in step S240 is NO), the CPU 11 exits from the transfer determining program, returning to step S110.

In step S240, when it is determined that the download-data size of the write target data has been entirely written in the RAM 15 (the determination in step S240 is YES), the CPU 11 goes to step S250. In step S250, the CPU 11 executes an operation required to send, to the external tool 5, a response to the write data transfer, and thereafter exits from the transfer determining program, returning to step S110. The response to the write data transfer is a response message indicating, to the external tool 5, that the download-data size of the write target data has been entirely written in the RAM 15.

On the other hand, in step S210, when it is determined that ROM identification code CD has been received (the determination in step S210 is YES), the CPU 11 goes to step S260. In step S260, the CPU 11 determines whether the rewrite control program download flag DF is set to its register.

When it is determined that the rewrite control program download flag DF is set to its register (the determination in step S260 is YES), the CPU 11 goes to step S270. In step S270, the CPU 11 shifts its execution location to the leading address of the rewrite control program RP in the RAM 15.

Thereafter, the CPU 11 runs the rewrite control program RP from the leading address thereof. Specifically, the CPU 11 executes the rewrite operations to update the new application program AP2 sent from the external tool 5 in the flash ROM 13. After completion of the new application program update, the CPU 11 sends, to the external tool 5, the response to the write data transfer.

In step S260, when it is determined that the rewrite control program download flag DF is not set to its register (the determination in step S260 is NO), the CPU 11 determines that the rewrite control program RP sent from the external tool 5 has not been stored in the RAM 15, going to step S280. In step S280, the CPU 11 copies the rewrite control program RP previously stored in the flash ROM 13 at the first address area into the RAM 15 from the leading address thereof. After completion of the rewrite control program copy, the CPU 11 shifts to the step S270.

In this case, the CPU 11 executes the rewrite control program RP copied from the flash ROM 13 into the RAM 15 in step S280.

Thereafter, the CPU 11 runs the rewrite control program RP from the leading address thereof. Specifically, the CPU 11 executes the rewrite operations to update the new application program AP2 sent from the external tool 5 in the flash ROM 13. After completion of the new application program update, the CPU 11 sends, to the external tool 5, the response to the write data transfer.

Next, individual operations of each of the external tools 5a to 5c-23 and of the ECU 1 will be described hereinafter with reference to FIGS. 6 to 8.

Figure 6:
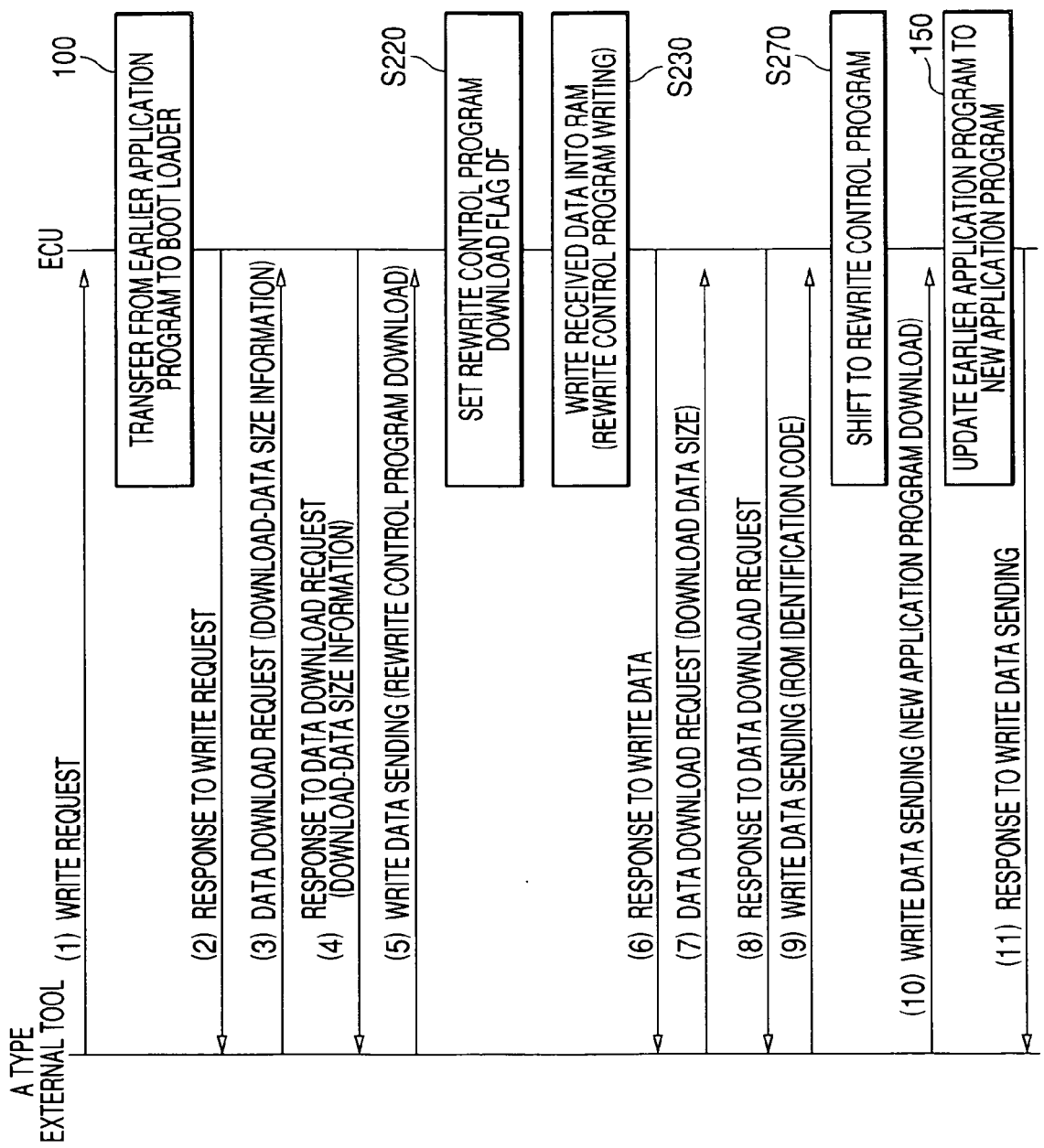
FIG. 6 is a sequence chart schematically illustrating communication procedures between the A type external tool and the ECU illustrated in FIG. 1.

First, FIG. 6 illustrates a sequence chart representing communication procedures between the A type external tool 5a and the ECU 1.

As illustrated by the reference numeral (1) in FIG. 6, when the predetermined operation is executed in the external tool 5a so that the write request RS is sent therefrom to the ECU 1, the execution location of the CPU 11 is shifted from the earlier application program AP1 to the boot loader BL. Thereafter, the boot loader BL is executed by the CPU 11. These operations of the CPU 11 are represented by the reference character 100 in FIG. 6.

In the boot loader BL, the affirmative determination is executed by the CPU 11 in step S120, and the response to the write request is sent therefrom to the A type external tool 5a in step S130, which is illustrated by the reference numeral (2) in FIG. 6.

When receiving the response to the write request, the A type external tool 5a sends, to the ECU 1, the data download request, as a preparation for sending the rewrite control program RP, which is illustrated by the reference numeral (3) in FIG. 6. The data download request includes the download-data size information indicating the total volume of the rewrite control program RP, that is, the total volume of the file F1.

In the boot loader BL, the affirmative determination is executed by the CPU 11 in step S140. Next, the download-data size information is stored in the RAM 15 by the CPU 11 in step S150, and the response to the data download request is sent therefrom to the A type external tool 5a in step S160, which is illustrated by the reference numeral (4) in FIG. 6.

When receiving the response to the data download request, the A type external tool 5a sends (downloads), to the ECU 1, the rewrite control program RP stored as the file F1 as the write target data, which is illustrated by the reference numeral (5) in FIG. 6. In more detail, the A type external tool 5a downloads, to the ECU 1, data constituting the rewrite control program RP as the write target data. In FIGS. 6 to 8, the write target data is described as "write data".

In the boot loader BL, the affirmative determination is executed by the CPU 11 in step S170. Next, the transfer determining program is executed by the CPU 11 in step S180 illustrated in FIG. 5.

In the transfer determining program, when the rewrite control program RP is sent from the A type external tool 5a, because the ROM identification code CD has not been sent therefrom, the negative determination is executed by the CPU 11 in step S210. Next, the rewrite control program download flag DF is set in the register by the CPU 11 in step S220, and a unit quantity of the rewrite control program RP is written in the RAM 15 by the CPU 11 in step S230.

In the boot loader BL, every time a unit quantity of the rewrite control program RP is sent from the A type control tool 5a, the affirmative determination is executed by the CPU 11 in step S220 and the operations in step S230 are executed thereby. As a result, when the total volume of the rewrite control program RP has been entirely written in the RAM 15, the affirmative determination is executed by the CPU 11 in step S240. Next, the response to the write data transfer is sent from the CPU 11 to the A type external tool 5a in step S250, which is illustrated by the reference numeral (6) in FIG. 6.

When receiving the response to the response to the rewrite data, the A type external tool 5a sends, to the ECU 1, the data download request as a preparation for sending the rewrite control program RP, which is illustrated by the reference numeral (7) in FIG. 6. The data download request includes the download-data size information indicating the total volume of the new application program Ap2, that is, the total volume obtained by subtracting the volume of the ROM identification code CD from the total volume of the file F2

In the boot loader BL, the affirmative determination is executed by the CPU 11 in step S140. Next, the download-data size information is stored in the RAM 15 by the CPU 11 in step S150, and the response to the data download request is sent therefrom to the A type external tool 5a in step S160, which is illustrated by the reference numeral (8) in FIG. 6.

When receiving the response to the data download request, the A type external tool 5a sends (downloads), to the ECU 1, a first unit quantity of the new application program AP2 stored in the file F2 and the write target data, which is illustrated by the reference numeral (9) in FIG. 6. That is, the A type external tool 5a downloads, to the ECU 1, the ROM identification code CD located at the top of the file F2.

In the boot loader BL, the affirmative determination is executed by the CPU 11 in step S170. Next, the transfer determining program is executed by the CPU 11 in step S180 (see FIG. 5).

In the transfer determining program, because the ROM identification code CD has been received by the CPU 11, the affirmative determination is executed by the CPU 11 in step S210. In addition, because the rewrite control program download flag DF has been set in the register by the CPU 11 in step S220 so that the rewrite control program RP has been stored in the RAM 11, the affirmative determination is executed by the CPU 11 in step S260. As a result, the execution location of the CPU 11 jumps to the leading address of the rewrite control program RP in the RAM 15 by the CPU 11 in step S270.

Thereafter, a unit quantity of the new application program AP2 is sequentially sent from the A type external tool 5a to the ECU 1, which is illustrated by the reference numeral (10) in FIG. 6. As a result, in the microcomputer 7, the rewrite control program RP downloaded to be stored in the RAM 15 from the A type external tool 5a is executed by the CPU 11. The execution of the rewrite control program RP by the CPU 11 allows the earlier application program AP1 stored in the flash ROM 13 to be sequentially updated into the new application program AP2 sent from the A type external tool 5a every sent unit of the program AP2, which is illustrated by the reference numeral 150 in FIG. 6.

The rewrite operations by the CPU 11 in accordance with the rewrite control program RP are carried out, for example, as follows. Specifically, a predetermined second address area of the flash ROM 13 in which the earlier application program AP1 is stored is cleared, and each sent unit of the program AP2 is sequentially stored in the second address area of the flash ROM 13.

After all units of the new application program AP2 has been stored in the storage area of the flash ROM 13, the response to the write data transfer is sent from the CPU 1 to the A type external tool 5a based on the rewrite control program RP, which is illustrated by the reference numeral (11) in FIG. 6. The response to the write data transfer indicates, to the external tool 5, that the download-data size of the new application program AP2 has been entirely stored in the RAM 15 so that the application program rewrite operations have been completed Secondly, FIG. 7 illustrates a sequence chart representing communication procedures between the B type external tool 5b and the ECU 1.

Figure 7:
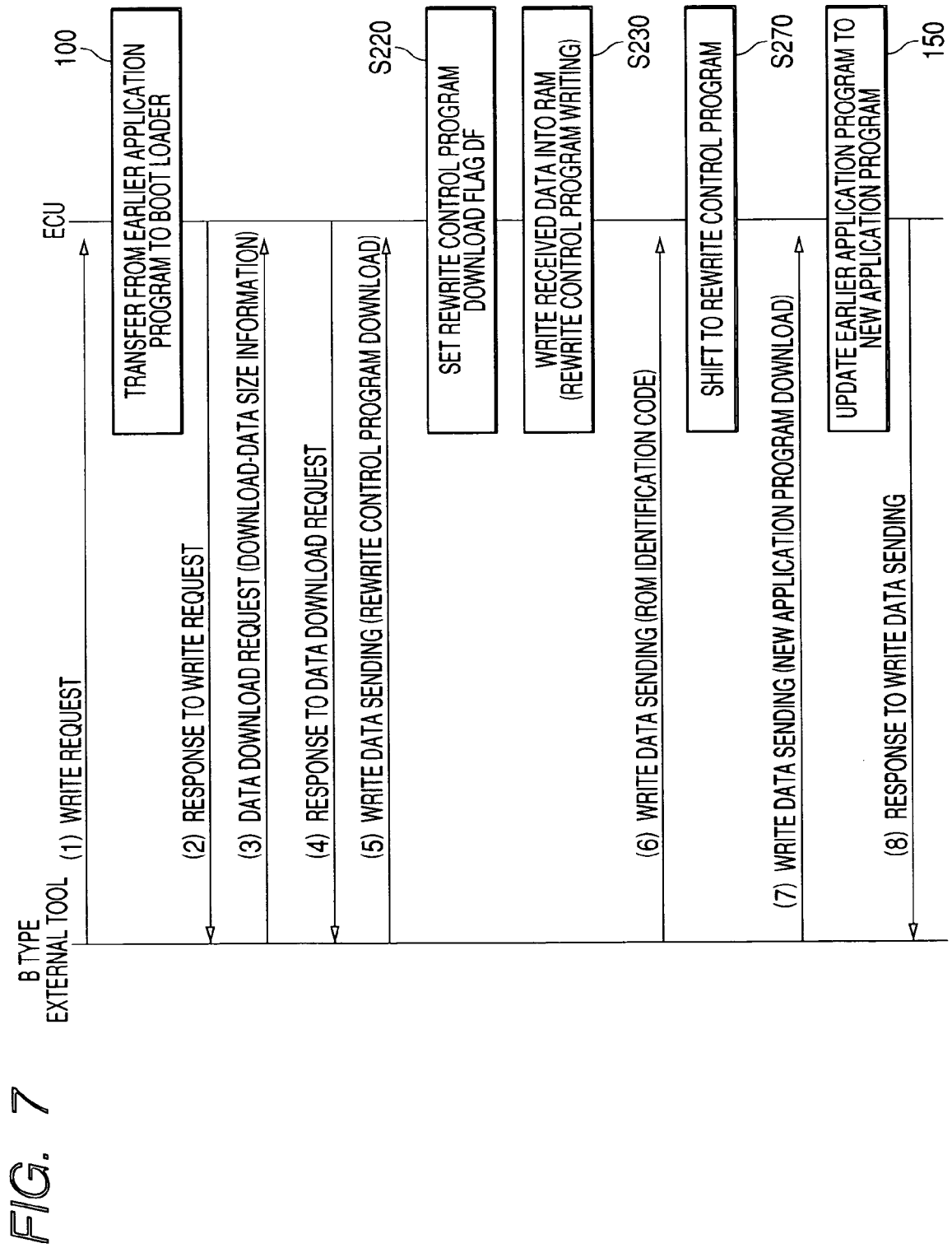
FIG. 7 is a sequence chart schematically illustrating communication procedures between the B type external tool and the ECU illustrated in FIG. 2.

In FIG. 7, the communication procedures up to the reference numeral (4) are substantially identical those up to the reference numeral (4) in FIG. 6 except for the procedure indicated by the reference numeral (3). In FIG. 7, as the procedure indicated by the reference numeral (3), the B type external tool 5b sends, to the ECU 1, the data download request. The data download request includes the download-data size information indicating the total volume of the rewrite control program RP and the new application program AP2, that is, the total volume obtained by subtracting the volume of the ROM identification code CD from the total volume of the file F3. The descriptions of the communication procedures up to the reference numeral (4) are therefore omitted.

When receiving the response to the data download request, the B type external tool 5b sends (downloads), to the ECU 1, the data stored in the file F3 as the write target data, which is illustrated by the reference numeral (5) in FIG. 7. In more detail, the B type external tool 5b downloads, to the ECU 1, data of the rewrite control program RP arranged at the first part of the file F3.

In the boot loader BL, the affirmative determination is executed by the CPU 11 in step S170. Next, the transfer determining program is executed by the CPU 11 in step S180 illustrated in FIG. 5.

In the transfer determining program, when the rewrite control program RP is sent from the B type external tool 5b, because the ROM identification code CD has not been sent therefrom, the negative determination is executed by the CPU 11 in step S210. Next, the rewrite control program download flag DF is set in the register by the CPU 11 in step S220, and a unit quantity of the rewrite control program RP is written in the RAM 15 by the CPU 11 in step S230.

In the boot loader BL, every time a unit quantity of the rewrite control program RP is sent from the B type control tool 5b, the affirmative determination is executed by the CPU 11 and the operations in step S220 and S230 are executed thereby.

After completion of the send of the rewrite control program RP, the B type external tool 5b sends, to the ECU 1, the ROM identification code CD located at the boundary between the rewrite control program RP and the new application program AP2 as the rewrite target data, which is illustrated by the reference numeral (6) in FIG. 7.

In the boot loader BL, the affirmative determination is executed by the CPU 11 in step S170. Next, the transfer determining program is executed by the CPU 111 in step S180 (see FIG. 5).

In the transfer determining program, because the ROM identification code CD has been received by the CPU 11, the affirmative determination is executed by the CPU 11 in step S210. In addition, because the rewrite control program download flag DF has been set in the register by the CPU 11 in step S220 so that the rewrite control program RP has been stored in the RAM 11, the affirmative determination is executed by the CPU 11 in step S260. As a result, the execution location of the CPU 11 jumps to the leading address of the rewrite control program RP in the RAM 15 by the CPU 11 in step S270.

Thereafter, a unit quantity of the new application program AP2 is sequentially sent from the B type external tool 5b to the ECU 1, which is illustrated by the reference numeral (7) in FIG. 7. As a result, in the microcomputer 7, the rewrite control program RP downloaded to be stored in the RAM 15 from the B type external tool 5b is executed by the CPU 11. The execution of the rewrite control program RP by the CPU 11 allows the earlier application program AP1 stored in the flash ROM 13 to be sequentially updated into the new application program AP2 sent from the B type external tool 5b every sent unit of the program AP2, which is illustrated by the reference numeral 150 in FIG. 7.

After all units of the new application program AP2 has been stored in the storage area of the flash ROM 13, the response to the write data transfer is sent from the CPU 1 to the B type external tool 5b based on the rewrite control program RP, which is illustrated by the reference numeral (8) in FIG. 7. The procedure indicated by the reference numeral (8) in FIG. 7 is similar to that indicated by the reference numeral (11) in FIG. 6. The response to the write data transfer indicates, to the external tool 5, that the download-data size of the new application program AP2 has been entirely stored in the RAM 15 so that the application program rewrite operations have been completed Thirdly, FIG. 8 illustrates a sequence chart representing communication procedures between the C type external tool 5c and the ECU 1.

Figure 8:
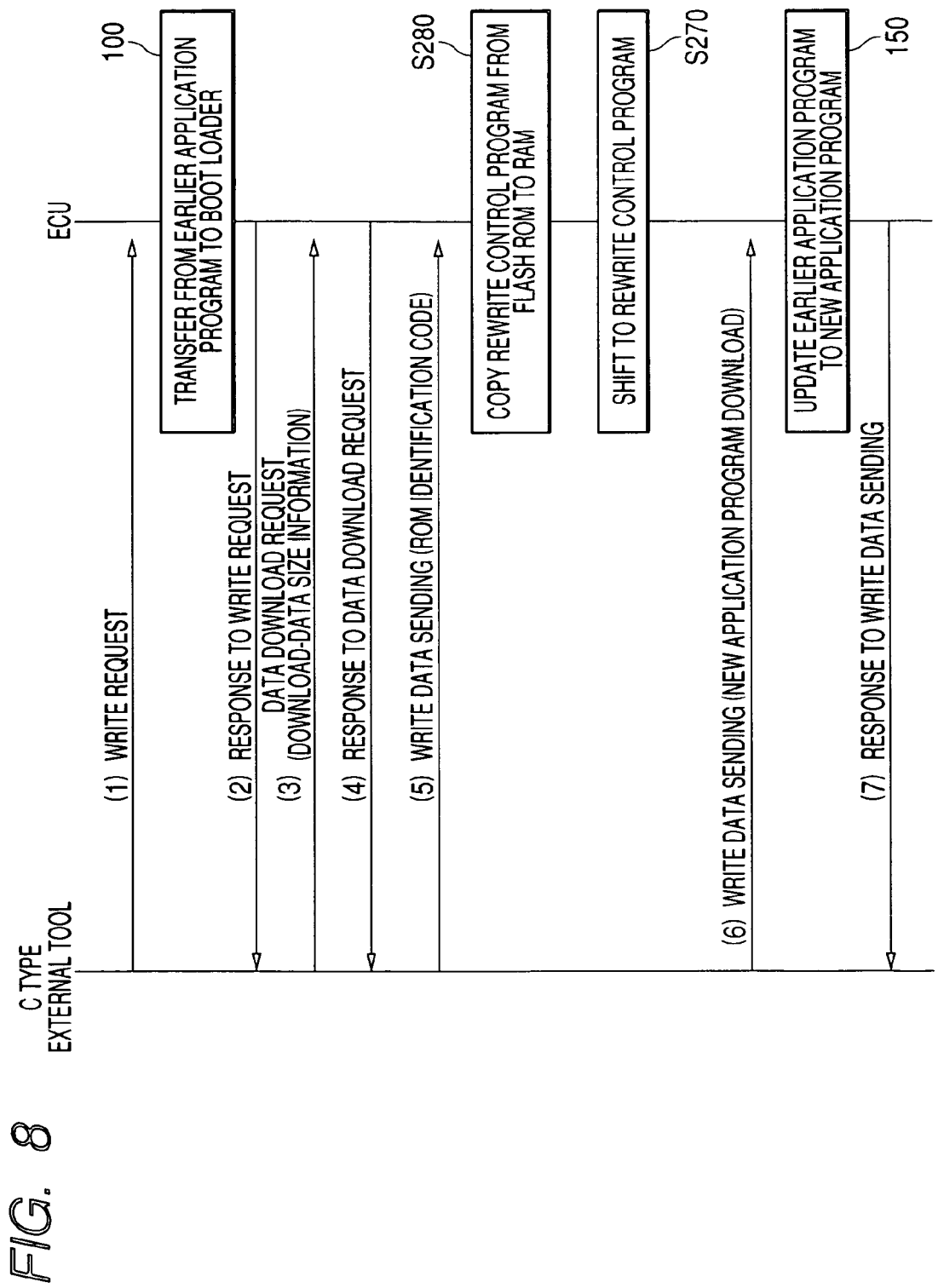
FIG. 8 is a sequence chart schematically illustrating communication procedures between the C type external tool and the ECU illustrated in FIG, 3.

In FIG. 8, the communication procedures up to the reference numeral (4) are substantially identical those up to the reference numeral (4) in FIG. 6 except for the procedure indicated by the reference numeral (3). In FIG. 8, as the procedure indicated by the reference numeral (3), the C type external tool 5c sends, to the ECU 1, the data download request. The data download request includes the download-data size information indicating the total volume of the new application program AP2, that is, the total volume obtained by subtracting the volume of the ROM identification code CD from the total volume of the file F2. The descriptions of the communication procedures up to the reference numeral (4) are therefore omitted.

When receiving the response to the data download request, the C type external tool 5c sends (downloads), to the ECU 1, the data stored in the file F2 as the write target data, which is illustrated by the reference numeral (5) in FIG. 8. In more detail, the C type external tool 5c downloads, to the ECU 1, the ROM identification code CD located at the top of the whole data stored in the file F2 as the rewrite target data, which is illustrated by the reference numeral (5) in FIG. 8.

In the boot loader BL, the affirmative determination is executed by the CPU 11 in step S170. Next, the transfer determining program is executed by the CPU 11 in step S180 illustrated in FIG. 5.

In the transfer determining program, because the ROM identification code CD has been sent from the C type external tool 5c, the affirmative determination is executed by the CPU 11 in step S210. Next, because no rewrite control program RP is downloaded from the C type external tool 5c and the rewrite control program download flag DF has not been set in the register by the CPU 11, the negative determination is executed by the CPU 11 in step S260.

As a result, the rewrite control program RP previously stored in the flash ROM 13 at the first address area is copied into the RAM 15 from the leading address thereof. Thereafter, the execution location of the CPU 11 jumps to the leading address of the rewrite control program RP in the RAM 15 by the CPU 11 in step S270.

After the procedure in step S270, a unit quantity of the new application program AP2 is sequentially sent from the C type external tool 5c to the ECU 1, which is illustrated by the reference numeral (6) in FIG. 8. As a result, in the microcomputer 7, the rewrite control program RP copied to be stored in the RAM 15 from the flash ROM 13 is executed by the CPU 11. The execution of the rewrite control program RP by the CPU 11 allows the earlier application program AP1 stored in the flash ROM 13 to be sequentially updated into the new application program AP2 sent from the C type external tool 5c every sent unit of the program AP2, which is illustrated by the reference numeral 150 in FIG. 8.

After all units of the new application program AP2 has been stored in the storage area of the flash ROM 13, the response to the write data transfer is sent from the CPU 1 to the C type external tool 5c based on the rewrite control program RP, which is illustrated by the reference numeral (7) in FIG. 8. The procedure indicated by the reference numeral (7) in FIG. 8 is similar to that indicated by the reference numeral (11) in FIG. 6. The response to the write data transfer indicates, to the external tool 5, that the download-data size of the new application program AP2 has been entirely stored in the RAM 15 so that the application program rewrite operations have been completed As described above, in the program rewriting system RS according to the first embodiment, any type of the external tool 5 is configured to send, to the ECU 1, the ROM identification code CD before sending the new application program AP2; this ROM identification code CD indicates that the following data from the identification code CD is the new application program AP2.

In the boot loader BL installed in the microcomputer 7 used for the ECU 1, when the rewrite control program RP is sent from the external tool 5, it is determined whether the ROM identification code CD has been sent therefrom in step S210. It is determined that the write target data sequentially sent from the external tool 5 is a part of (a module of) the rewrite control program RP until it is determined that the ROM identification code CD has been sent therefrom in step S210. As a result, the write target data is stored in the RAM 15 as part of the rewrite control program RP in step S230. When it is determined that the ROM identification code CD has been sent from the external tool 5 in step S210, it is determined that the write target data sent from the external tool 5 after the determination in step S210 is part of the new application program AP2. Thereafter, it is determined whether the rewrite control program download flag DF has been set in the register of the CPU 11 in order to judge whether the rewrite control program RP sent from the external tool 5 has been stored in the RAM 15.

In step S260, when it is determined that the rewrite control program RP sent from the external tool 5 has been stored in the RAM 15, the execution location of the CPU 11 jumps to the leading address of the rewrite control program RP in the RAM 15 so that the rewrite control program RP runs in step S270. In contrast, when it is determined that the rewrite control program RP has not been stored in the RAM 15 in step S260, the rewrite control program RP is copied to the RAM 15 from the first address area of the flash ROM 13 in step S280. Thereafter, the execution location of the CPU 11 jumps to the leading address of the rewrite control program RP in the RAM 15, allowing the rewrite control program RP to run in step S270

When the external tool 5 is the A type external tool 5a or the B type external tool 5b, the rewrite control program RP sent from the A type external tool 5a or the B type external tool 5b is stored in the RAM 15. Thereafter, when the ROM identification code CD is sent from the A type external tool 5a or the B type external tool 5b, it is determined that the rewrite control program RP sent from the A type external tool 5a or the B type external tool 5b has been stored in the RAM 15 in step S260. This allows the rewrite control program RP to run. Execution of the rewrite control program RP permits the earlier application program AP1 stored in the flash ROM 13 to be updated to the new application program AP2 therein; this new application program AP2 is sent from the external tool 5a or 5b after the rewrite control program execution.

In contrast, when the external tool 5 is the C type external tool 5c, because no rewrite control program is sent therefrom, when the ROM identification code CD is sent from the C type external tool 5c, it is determined that the rewrite control program RP has not been stored in the RAM 15 in step S260. This allows the rewrite control program RP previously stored in the first address area of the flash ROM 13 is copied to the RAM 15 so that the rewrite control program RP is run on the RAM 15. Thereafter, execution of the rewrite control program RP permits the earlier application program AP1 stored in the flash ROM 13 to be updated to the new application program AP2 therein; this new application program AP2 is sent from the external tool 5c after the rewrite control program execution.

As set forth above, even if using the external tool 5 with any one of the A to C types, the boot loader BL according to the first embodiment allows the earlier application program AP1 to be accurately updated (rewritten) into the new application program AP2.

In addition, the boot loader BL according to the first embodiment eliminates the need to develop dedicated boot loaders for the types A to C of external tools, making it possible to reduce the number of processes for developing the ECU 1 and/or to simplify management of the ECU 1 and the boot loader 7.

Note that, in step S280 of FIG. 5, the execution location of the CPU 11 can jump to the leading address of the rewrite control program RP stored in the flash ROM 13 without copying it to the RAM 15. In this modification, because the first address area in which the rewrite control program RP has been stored is different from the second address area in which the earlier application program AP1 is stored in the flash ROM 13, it is possible to run the rewrite control program RP on the flash ROM 13.

Second Embodiment

A program rewriting system according to a second embodiment of the present invention will be described hereinafter.

Note that elements of the program rewriting system RS1 according to the second embodiment, which are substantially identical to those of the program rewriting system RS according to the first embodiment, are represented by the same reference characters as in FIGS. 1 to 3. Descriptions of the elements of the program rewriting system according to the second embodiment are therefore omitted or simplified.

As compared with the program rewriting system RS according to the first embodiment, the program rewriting system according to the second embodiment is operative to send a destination address, which for example corresponds to destination information, before sending the write target data, such as the rewrite control program RS or the new application program AP2.

Specifically, the destination address preferably indicates a leading address of a predetermined memory space at which the write target data to be sent should be stored in the target memory, such as the flash ROM 13 or the RAM 15. Any type of the external tool 5 is configured to send, to the ECU 1, the data download request including the destination address of the write target data and the download-data size information.

In addition, in the program rewriting system RS1 according to the second embodiment, no ROM identification codes have been stored in the files F1, F2, and F3 stored in at least one of the A type external tool 5a, B type external tool 5b, and the C type external tool 5c.

Next, the specific instructions (procedures) of the boot loader BL according to the second embodiment will be described hereinafter with reference to FIGS. 9 and 10. Similar to the first embodiment, the boot loader BL according to the second embodiment is able to meet any types of external tools 5a to 5c, and to realize the rewrite operations in cases of using any one of the external tools 5a to 5c.

Figure 9:
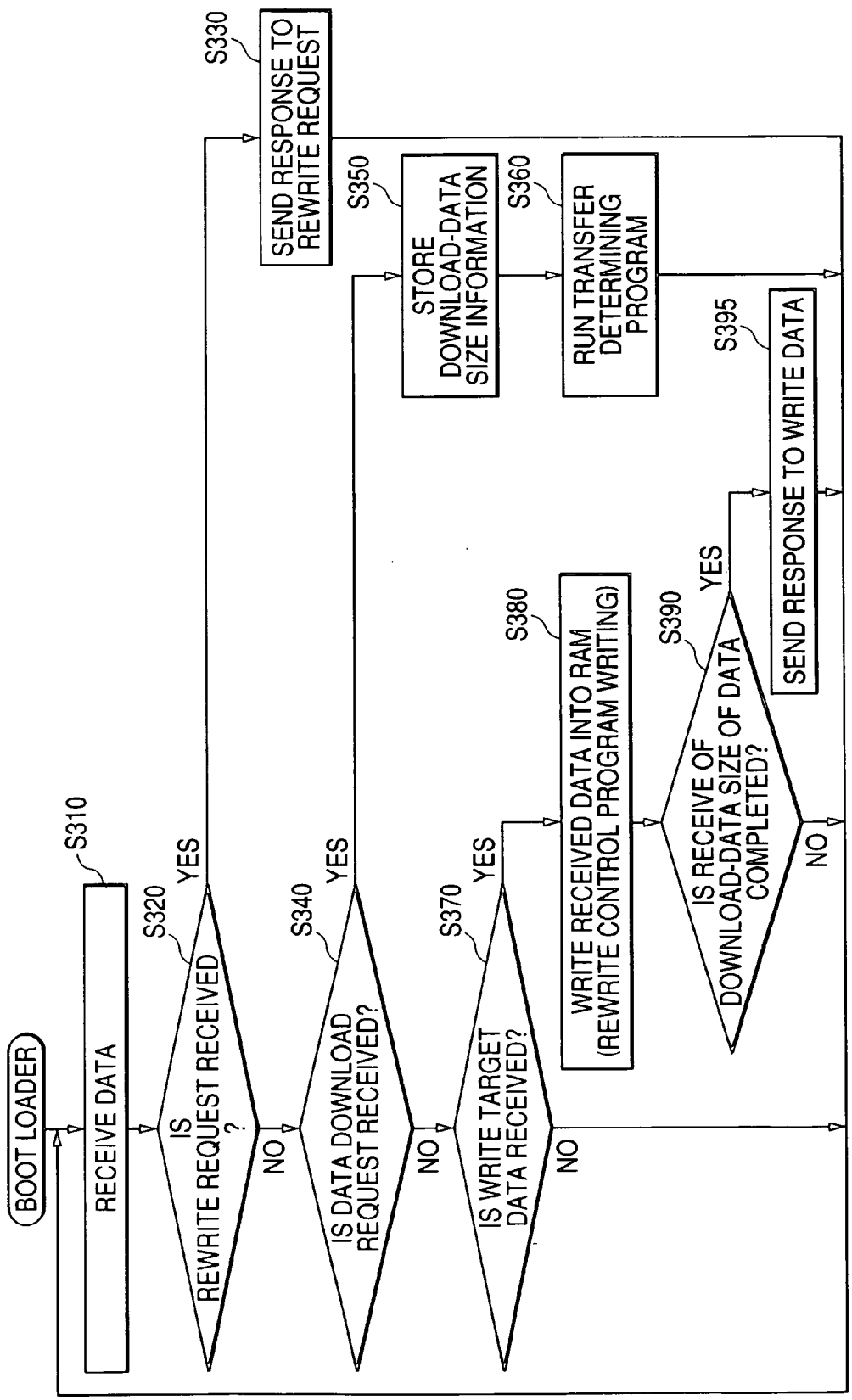
FIG. 9 is a flowchart schematically illustrating the overall procedure of a boot loader according to a second embodiment of the present invention.

FIG. 9 schematically illustrates the overall procedure of the boot loader BL.

Like the first embodiment, the CPU 11 of the microcomputer 7 of the ECU 1 shifts its execution location from the earlier application program AP1 to the boot loader BL when the write request is sent from the external tool 5 to the ECU 1. When the CPU 11 launches the procedures of the boot loader BL, in step S310, the CPU 11 receives a unit quantity of the data sent from the external tool 5 and received by the communication driver 9. Next, in step S320, the CPU 11 analyzes the received unit quantity of data to determine whether the received unit quantity of data is the write request based on the analyzed result.

If it is determined that the write request has been received (the determination in step S320 is YES), the CPU 11 goes to step S330 to execute an operation required to send, to the external tool 5, a response to the write request, and thereafter returning to the step S310. The response to the write request is a response message indicating, to the external tool 5, that the write request is normally received.

If it is not determined in step S320 (the determination in step S320 is NO), the CPU 11 goes to step S340. In step S340, the CPU 11 analyzes the received unit quantity of data in step S310 to determine whether the received unit quantity of data is the data download request based on the analyzed result.

The data download request is a command to indicate, to the ECU 1, that the external tool 5 starts to send the write target data; this write target data specifically is the rewrite control program RP or the new application program AP2. The data download request includes the download-data size information indicating the total volume of the write target data, and the destination address thereof.

If it is determined that the data download request has been received (the determination in step S340 is YES), the CPU 11 goes to step S350 to store the download-data size information in the RAM 15. Subsequently, in the next step S360, the CPU 11 executes a transfer determining program, such as a subroutine, according to the second embodiment, which is illustrated in FIG. 10 hereinafter, and thereafter returns to step S310. The transfer determining program is part of the boot loader BL.

Figure 10:
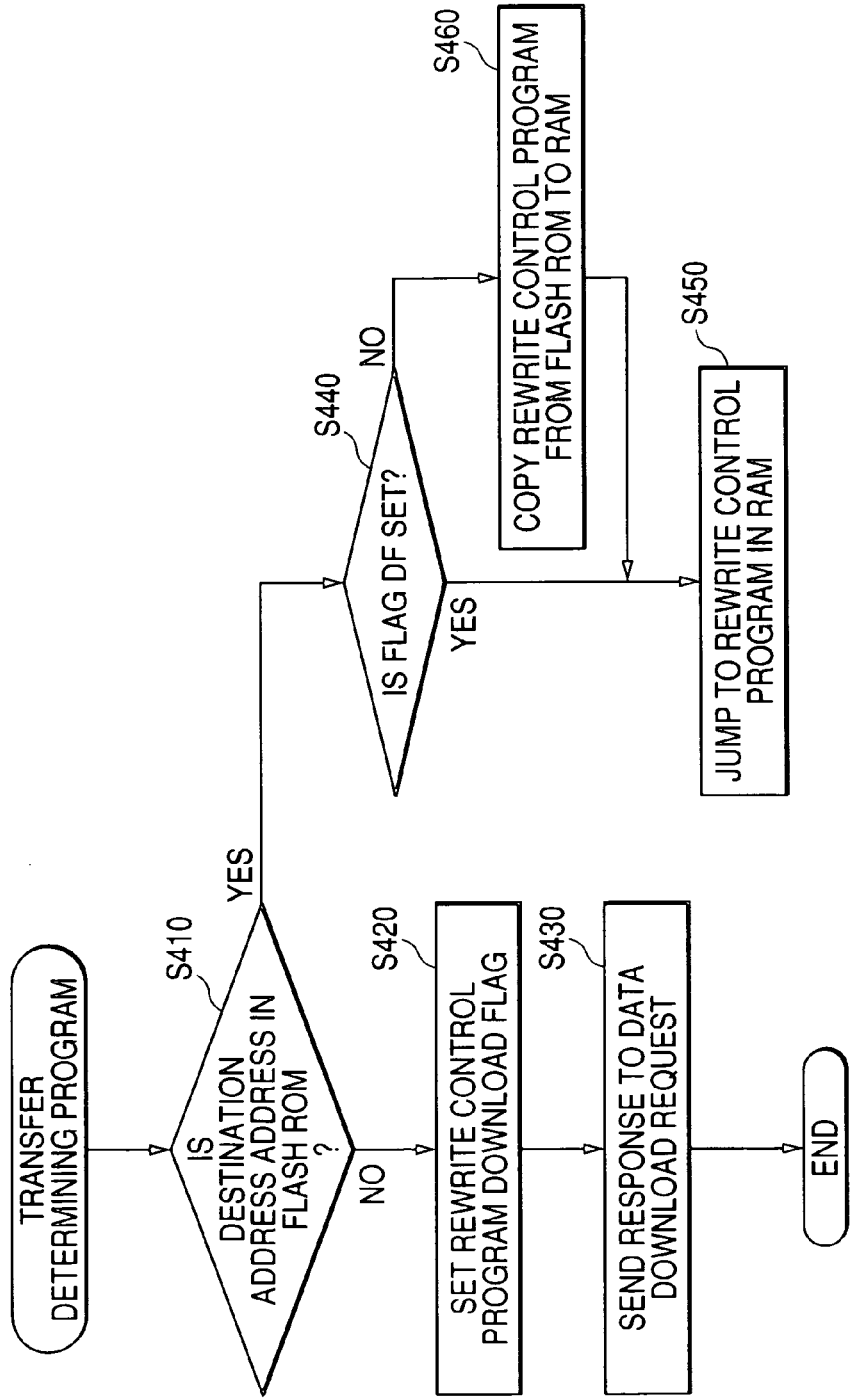
FIG. 10 is a flowchart schematically illustrating an algorithm of a transfer determining program included in the boot loader illustrated in FIG. 9.

When launching the transfer determining program, the CPU 11 determines whether the destination address included in the data download request is an address in the flash ROM 13 in step S410 of FIG. 10.

When it is determined that the destination address included in the data download request is not an address in the flash ROM 13 (the determination in step S410 is NO), the CPU 11 goes to step S420. In step S420, the CPU 11 sets the rewrite control program download flag DF in its register; this flag DF indicates that the download of the rewrite control program RP has been completed. Next, the CPU 11 executes an operation required to send, to the external tool 5, a response to the data download request, and thereafter exits from the transfer determining program, returning to step S110. The response to the data download request is a response message indicating, to the external tool 5, that the data download request is normally received. In this case, after sending the response to the data download request, the rewrite control program RP is sent from the external tool 5 to the ECU 1, and the rewrite control program RP is stored in the RAM 15 by the operation of the CPU 11 in step S380 described hereinafter.

When it is determined that the destination address included in the data download request is an address in the flash ROM 13 (the determination in step S410 is YES), the CPU 11 goes to step S440. In step S440, the CPU 11 determines whether the rewrite control program download flag DF is set to its register.

When it is determined that the rewrite control program download flag DF is set to its register (the determination in step S440 is YES), the CPU 11 determines that the rewrite control program RP sent from the external tool 5 has been stored in the RAM 15, going to step S450. In step S450, the CPU 11 causes its execution location to jump to the leading address of the rewrite control program RP in the RAM 15.

Thereafter, the CPU 11 runs the rewrite control program RP from the leading address thereof. Specifically, the CPU 11 executes the rewrite operations to update the new application program AP2 sent from the external tool 5 in the flash ROM 13. After completion of the new application program update, the CPU 11 sends, to the external tool 5, the response to the write data transfer.

In step S440, when it is not determined (the determination in step S440 is NO), the CPU 11 determines that the rewrite control program RP sent from the external tool 5 has not been stored in the RAM 15, going to step S460. In step S460, the CPU 11 copies the rewrite control program RP previously stored in the flash ROM 13 at the first address area into the RAM 15 from the leading address thereof. After completion of the rewrite control program copy, the CPU 11 shifts to the step S450.

In this case, the CPU 11 executes the rewrite control program RP copied from the flash ROM 13 into the RAM 15 in step S460.

Thereafter, the CPU 11 runs the rewrite control program RP from the leading address thereof. Specifically, the CPU 11 executes the rewrite operations to update the new application program AP2 sent from the external tool 5 in the flash ROM 13. After completion of the new application program update, the CPU 11 sends, to the external tool 5, the response to the write data transfer.

On the other hand, in step S340 in FIG. 9, when it is determined that the data download request has not been received (the determination in step S340 is NO), the CPU 11 goes to step 370. In step S370, the CPU 11 analyzes the received unit quantity of data in step S110 to determine whether the received unit quantity of data is part of the write target data based on the analyzed result.

When it is determined that the write target data has not been received (the determination in step S370 is NO), the CPU 11 returns to step S110. When it is determined that the write target data has been received (the determination in step S370 is YES), the CPU 11 goes to step S380. In step S380, the CPU 11 writes the current received data, that is, the write target data, into the RAM 15 at a predetermined address thereof as data constituting the rewrite control program RP.

In the next step S390, the CPU 11 determines whether received data volume is equivalent to the total volume indicated by the download-data size information stored in the RAM 15 in step S350. In other words, the CPU 11 determines whether the download-data size of the write target data has been entirely written in the RAM 15 in step S390.

When it is determined that the download-data size of the write target data has not been entirely written in the RAM 15 (the determination in step S390 is NO), the CPU 11 returns to step S310.

In step S390, when it is determined that the download-data size of the write target data has been entirely written in the RAM 15 (the determination in step S390 is YES), the CPU 11 goes to step S395. In step S395, the CPU 11 executes an operation required to send, to the external tool 5, a response to the write data transfer, and thereafter exits from the transfer determining program, returning to step S310. The response to the write data transfer is a response message indicating, to the external tool 5, that the download-data size of the write target data has been entirely written in the RAM 15.

Next, individual operations of each of the external tools 5a to 5c and of the ECU 1 will be described hereinafter with reference to FIGS. 1 and 12.

Figure 11:
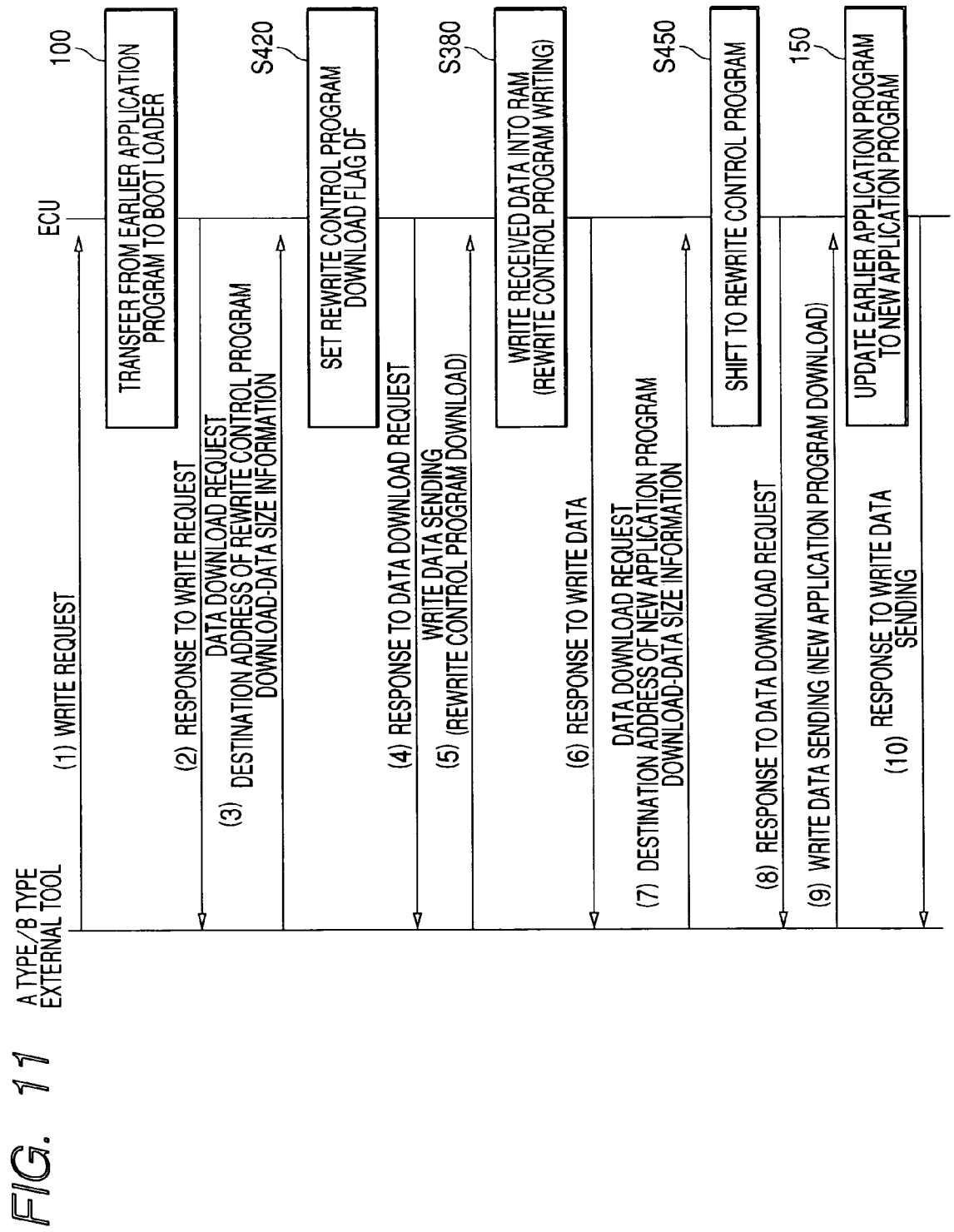
FIG. 11 is a sequence chart schematically illustrating communication procedures between each of the A type external tool and the B type external tool and the ECU.

First, FIG. 11 illustrates a sequence chart representing communication procedures between the external tool 5a or and the ECU As illustrated by the reference numeral (1) in FIG. 11, when the predetermined operation is executed in the external tool 5a or 5b so that the write request RS is sent therefrom to the ECU 1, the execution location of the CPU 11 is shifted from the earlier application program AP1 to the boot loader BL. Thereafter, the boot loader BL is executed by the CPU 11. These operations of the CPU 11 are represented by the reference character 100 in FIG. 11.

In the boot loader BL, the affirmative determination is executed by the CPU 11 in step S320, and the response to the write request is sent therefrom to the A type external tool 5a or B type external tool 5b in step S330, which is illustrated by the reference numeral (2) in FIG. 11.

When receiving the response to the write request, the A type external tool 5a or B type external tool 5b sends, to the ECU 1, the data download request, as a preparation for sending the rewrite control program RP, which is illustrated by the reference numeral (3) in FIG. 11. The data download request includes the destination address of the rewrite control program RP in the RAM 15 and the download-data size information indicating the total volume of the rewrite control program RP.

In the boot loader BL, the affirmative determination is executed by the CPU 11 in step S340. Next, the download-data size information is stored in the RAM 15 by the CPU 11 in step S350, and the transfer determining program is executed by the CPU 11 in step S360 illustrated in FIG. 10.

In the transfer determining program, because the destination address included in the data down load request sent from the external tool 5a or 5b, which is illustrated by the reference numeral (3) in FIG. 11, is not an address of the flash ROM 13 but the RAM 15, the negative determination is executed by the CPU 11 in step S410. In this case, the rewrite control program download flag DF is set in the register by the CPU 11 in step S420, and the response to the data download request is sent therefrom to the A type external tool 5a or B type external tool 5b in step S430, which is illustrated by the reference numeral (4) in FIG. 11.

When receiving the response to the data download request, the A type external tool 5a or the B type external tool 5b sends (downloads), to the ECU 1, the rewrite control program RP as the write target data, which is illustrated by the reference numeral (S) in FIG. 11. In more detail, the A type external tool 5a or the B type external tool 5b downloads, to the ECU 1, data constituting the rewrite control program RP as the write target data. In FIGS. 11 and 12, the write target data is described as "write data".

In the boot loader BL, every time a unit quantity of the rewrite control program RP is sent from the A type control tool 5a, the affirmative determination is executed by the CPU 11 in S370 and the operations in step S380 are executed thereby. As a result, when the total volume of the rewrite control program RP has been entirely written in the RAM 15, the affirmative determination is executed by the CPU 11 in step S390. Next, the response to the write data transfer is sent from the CPU 11 to the A type external tool 5a or the B type external tool 5b in step S395, which is illustrated by the reference numeral (6) in FIG. 11.

When receiving the response to the response to the rewrite data, the A type external tool 5a or the B type external tool 5b sends, to the ECU 1, the data download request as a preparation for sending the rewrite control program RP, which is illustrated by the reference numeral (7) in FIG. 11. The data download request includes the download-data size information indicating the total volume of the new application program Ap2 and the destination address thereof in the flash ROM 13.

In the boot loader BL, the affirmative determination is executed by the CPU 11 in step S340. Next, the download-data size information is stored in the RAM 15 by the CPU 11 in step S350, and the transfer determining program is executed by the CPU 11 in step S360 illustrated in FIG. 10.

In the transfer determining program, because the destination address included in the data down load request sent from the external tool 5a or 5b, which is illustrated by the reference numeral (7) in FIG. 11, is an address of the flash ROM 13, the affirmative determination is executed by the CPU 11 in step S410. In this case, because the rewrite control program download flag DF has been set in the register of the CPU 11 so that the rewrite control program RP sent from the external tool 5a or 5b before the new application program AP2 being sent therefrom, the affirmative determination is executed by the CPU 11 in step S440. As a result, the execution location of the CPU 11 jumps to the leading address of the rewrite control program RP in the RAM 15 by the CPU 11 in step S450.

Thereafter, the rewrite control program RP sent form the external tool 5a or 5b and stored in the RAM 15 is executed by the CPU 11.

Specifically, the response to the data download request is sent therefrom to the A type external tool 5a or B type external tool 5b, which is illustrated by the reference numeral (8) in FIG. 11. When receiving the response to the data download request, the external tool 5a or 5b sequentially sends (downloads), to the ECU 1, a unit quantity of the new application program AP2, which is illustrated by the reference numeral (9) in FIG. 11.

As a result, in the microcomputer 7, the execution of the rewrite control program RP by the CPU 11 allows the earlier application program AP1 stored in the flash ROM 13 to be sequentially updated into the new application program AP2 sent from the external tool 5*a* or 5*b* every sent unit of the program AP2, which is illustrated by the reference numeral 150 in FIG. 11.

After all units of the new application program AP2 has been stored in the storage area of the flash ROM 13, the response to the write data transfer is sent from the CPU 1 to the external tool 5*a* or 5*b* based on the rewrite control program RP, which is illustrated by the reference numeral (10) in FIG. 11. Specifically, the procedure indicated by the reference numeral (8) in FIG. 11 and that indicated by the reference numeral (10) in FIG. 11 are executed by the CPU 11 based on the rewrite control program RP.

Figure 12:
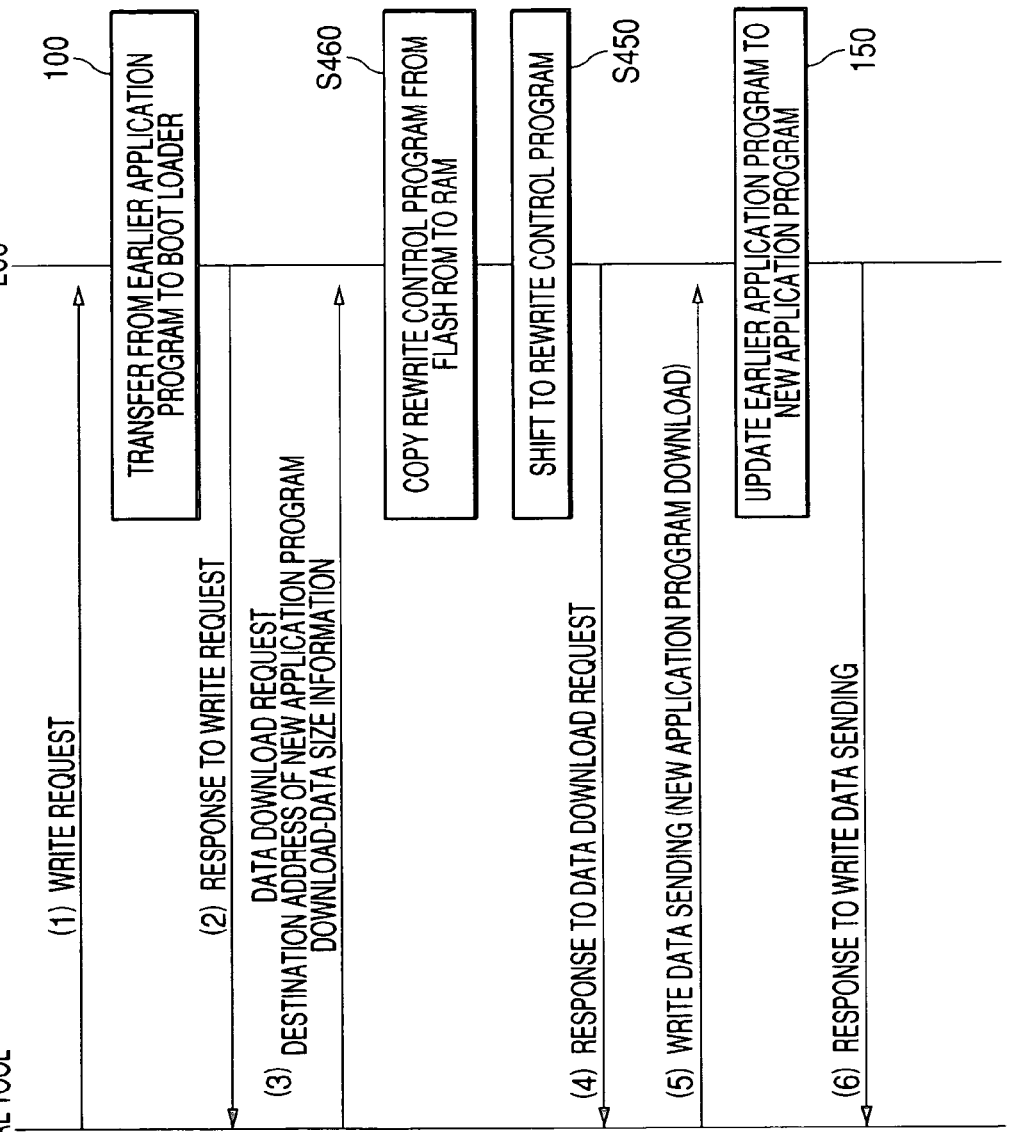
FIG. 12 is a sequence chart schematically illustrating communication procedures between the C type external tool and the ECU.

Secondary, FIG. 12 illustrates a sequence chart representing communication procedures between the C type external tool 5*c* and the ECU 1.

In FIG. 12, the communication procedures up to the reference numeral (2) are substantially identical those up to the reference numeral (2) in FIG. 11, and therefore the descriptions of the communication procedures up to the reference numeral (2) are therefore omitted.

When receiving the response to the write request, the C type external tool 5*c* sends, to the ECU 1, the data download request, as a preparation for sending the rewrite control program RP, which is illustrated by the reference numeral (3) in FIG. 12. The data download request includes the download-data size information indicating the total volume of the new application program Ap2 and the destination address thereof in the flash ROM 13.

In the boot loader BL, the affirmative determination is executed by the CPU 11 in step S340. Next, the download-data size information is stored in the RAM 15 by the CPU 11 in step S350, and the transfer determining program is executed by the CPU 11 in step S360 illustrated in FIG. 10.

In the transfer determining program, because the destination address included in the data down load request sent from the external tool 5*c*, which is illustrated by the reference numeral (3) in FIG. 12, is an address of the flash ROM 13, the affirmative determination is executed by the CPU 11 in step S410. In this case, because the rewrite control program download flag DF has not been set in the register of the CPU 11 so that the rewrite control program RP has not been sent from the external tool 5*c*, the negative determination is executed by the CPU 11 in step S440. As a result, the rewrite control program RP, which has been stored in the first address area of the flash ROM 13, is copied to the RAM 15 from the first address area of the flash ROM 13.

Thereafter, the execution location of the CPU 11 jumps to the leading address of the rewrite control program RP in the RAM 15 by the CPU 11 in step S450.

As a result, in the microcomputer 7, the rewrite control program RP, which is copied from the flash ROM 13 to the RAM 15, is launched by the CPU 11. This allows the response to the data download request to be sent to the C type external tool 5*c*, which is illustrated by the reference numeral (8) in FIG. 11.

When receiving the response to the data download request, the external tool 5*c* sequentially sends (downloads), to the ECU 1, a unit quantity of the new application program AP2, which is illustrated by the reference numeral (5) in FIG. 12.

As a result, in the microcomputer 7, the execution of the rewrite control program RP by the CPU 11 allows the earlier application program AP1 stored in the flash ROM 13 to be sequentially updated into the new application program AP2 sent from the C type external tool 5*c* every sent unit of the program AP2. This operation is illustrated by the reference numeral 150 in FIG. 6.

After all units of the new application program AP2 has been stored in the storage area of the flash ROM 13, the response to the write data transfer is sent from the CPU 1 to the external tool 5*c* based on the rewrite control program RP, which is illustrated by the reference numeral (6) in FIG. 12. Specifically, the procedure indicated by the reference numeral (4) in FIG. 12 and that indicated by the reference numeral (6) in FIG. 12 are executed by the CPU 11 based on the rewrite control program RP.

As described above, in the program rewriting system according to the second embodiment, any type of the external tool 5 is configured to send, to the ECU 1, the destination address of the write target data before sending the new application program AP2.

In the boot loader BL installed in the microcomputer 7 used for the ECU 1, after the write request is sent from the external tool 5, when the data download request including the destination address is sent from the external tool 5, it is determined whether the destination address is an address in the flash ROM 13. It is determined that the write target data sequentially sent from the external tool 5 is part of the rewrite control program RP until it is determined that the destination address is an address in the flash ROM 13 in step S410. As a result, the write target data is stored in the RAM 15 as part of the rewrite control program RP in step S380. When it is determined that the destination address is an address in the flash ROM 13 in step S410, it is determined that the write target data sent from the external tool 5 after the determination in step S410 is part of the new application program AP2. Thereafter, it is determined whether the rewrite control program download flag DF has been set in the register of the CPU 11 in order to judge whether the rewrite control program RP sent from the external tool 5 has been stored in the RAM 15.

In step S440, when it is determined that the rewrite control program RP sent from the external tool 5 has been stored in the RAM 15, the execution location of the CPU 11 jumps to the leading address of the rewrite control program RP in the RAM 15 so that the rewrite control program RP runs in step S450. In contrast, when it is determined that the rewrite control program PP has not been stored in the RAM 15 in step S440, the rewrite control program RP is copied to the RAM 15 from the first address area of the flash ROM 13 in step S460. Thereafter, the execution location of the CPU 11 jumps to the leading address of the rewrite control program RP in the RAM 15, allowing the rewrite control program RP to run in step S450.

When the external tool 5 is the A type external tool 5*a* or the B type external tool 5*b*, the rewrite control program RP sent from the A type external tool 5*a* or the B type external tool 5*b* is stored in the RAM 15. Thereafter, when the data download request including an address in the flash ROM 13 as the destination address is sent from the A type external tool 5*a* or the B type external tool 5*b*, it is determined that the rewrite control program RP sent from the A type external tool 5*a* or the B type external tool 5*b* has been stored in the RAM 15 in step S440. This allows the rewrite control program RP to run. Execution of the rewrite control program RP permits the earlier application program AP1 stored in the flash ROM 13 to be updated to the new application program AP2 therein; this new application program AP2 is sent from the external tool 5*a* or 5*b* after the rewrite control program execution.

In contrast, when the external tool 5 is the C type external tool 5*c*, because no rewrite control program is sent therefrom, when the ROM identification code CD is sent from the C type external tool 5*c*, it is determined that the rewrite control program RP has not been stored in the RAM 15 in step S260 This allows the rewrite control program RP previously stored in the first address area of the flash ROM 13 is copied to the RAM 15 so that the rewrite control program RP is run on the RAM 15. Thereafter, execution of the rewrite control program RP permits the earlier application program AP1 stored in the flash ROM 13 to be updated to the new application program AP2 therein; this new application program AP2 is sent from the external tool 5*c* after the rewrite control program execution.

As described above, in the second embodiment, even if using the external tool 5 with any one of the A to C types, the boot loader BL according to the second embodiment allows the earlier application program AP1 to be accurately updated (rewritten) into the new application program AP2.

In addition, the boot loader BL according to the second embodiment eliminates the need to develop dedicated boot loaders for the types A to C of external tools, making it possible to reduce the number of processes for developing the ECU 1 and/or to simplify management of the ECU 1 and the boot loader 7.

Note that, in step S440 of FIG. 10, the execution location of the CPU 11 can jump to the leading address of the rewrite control program RP stored in the flash ROM 13 without copying it to the RAM 15. In this modification, because the first address area in which the rewrite control program RP has been stored is different from the second address area in which the earlier application program AP1 is stored in the flash ROM 13, it is possible to run the rewrite control program RP on the flash ROM 13.

In each of the first and second embodiments, the ECU 1 includes the flash ROM 13 as one example of rewritable nonvolatile memories, but can include at least one of other types rewritable nonvolatile memories, such as an EEPROM.

In each of the first and second embodiments, note that the write request can be transmitted from the external tool 5 to the ECU 1 through a signal line different from the communication line 3.

In each of the first and second embodiments, the program rewriting system includes an ECU installed in an automobile, but the program rewriting system can include a control unit installed in other types of machines. Moreover, in each of the first and second embodiments, the ECU 1 is operative to control an engine installed in an automobile as a target, but the ECU 1 can control, as a target, other components installed in an automobile, such as a brake, a transmission, and suspensions.

In each of the first and second embodiments, it is important to note that, while the present invention has been and will continue to be described in the context of each of fully functional computers, such as the ECU 1 and the external tool 5. In the present invention, however, the elements provided in each of the ECU 1 and the external tool 5 can be implemented as dedicated hardware devices, such as custom LSI (Large-Scale Integration) circuits.

Moreover, those skilled in the art will appreciate that the present invention is capable of being distributed as program products, for example, the boot loader BL in a variety of forms. It is also important to note that the present invention applies equally regardless of the particular type of signal bearing media used to actually carry out the distribution. Examples of suitable signal bearing media include recordable type media such as CD-ROMs and DVD-ROMs, and transmission type media such as digital and analog communications links.

While there has been described what is at present considered to be the embodiments and modifications of the present invention, it will be understood that various modifications which are not described yet may be made therein, and it is intended to cover in the appended claims all such modifications as fall within the true spirit and scope of the invention.

What is claimed is:

1. A system with a first memory for rewriting a first application program stored in the first memory into a second application program, the system comprising:
    an external device configured to store therein the second application program and configured to carry out any one of:
        a first procedure to thereby: send a rewrite control program stored in the external device as write target data; send an identifier identifying that data subsequent to the sending of the identifier represents the second application program; and send, subsequent to the sending of the identifier, the second application program as the write target data; and
        a second procedure to thereby send the identifier identifying that data subsequent to the sending of the identifier represents the second application program; and send, subsequent to the sending of the identifier, the second application program as the write target data without sending the rewrite control program, the rewrite control program, which is previously stored, allowing the system to rewrite the first application program into the second application program; and
    a control unit having a second memory and communicably coupled to the external device when rewriting the first application program into the second application program, the control unit comprising:
        a determining unit configured to determine whether to receive the identifier sent from the external device;
        a first identification unit configured to store, in the second memory, the write target data sent from the external device as the rewrite control program when determining that the identifier has not been received; and
        a second identification unit configured to, when determining that the identifier has been received, identify that the write target data sent from the external device is the second application program, and rewrite the first application program into the second application program sent from the external device as the write target data.

2. A system according to claim 1, the second identification unit is configured to:
    determine whether the rewrite control program has been stored in the second memory after it is determined that the identifier is received;
    launch the rewrite control program to rewrite the first application program into the second application program when it is determined that the rewrite control program has been stored in the second memory; and
    identify that the rewrite control program has been stored in one of the first memory and another memory installed in the system when it is determined that the rewrite control program has not been stored in the second memory.

3. A system according to claim 2, wherein the first identification unit is configured to set a flag when determining that the identifier has not been received, and the second identification unit is configured to determine whether the flag is set after it is determined that the identifier is received and to determine that the rewrite control program has been stored in the second memory when it is determined that the flag is set.

4. A system according to claim 2, wherein the first memory is a rewritable nonvolatile memory, and the second memory is a rewritable volatile memory, and the second identification unit is configured to run the rewrite control program stored in the rewritable nonvolatile memory thereon when the rewrite control program has not been stored in the rewritable volatile memory.

5. A system according to claim 2, wherein the first memory is a rewritable nonvolatile memory, and the second memory is a rewritable volatile memory, and the second identification unit is configured to copy the rewrite control program stored in the rewritable nonvolatile memory into the rewritable volatile memory when the rewrite control program has not been stored in the rewritable volatile memory, and to run the rewrite control program stored in the rewritable volatile memory thereon to rewrite the first application program into the second application program.

6. A program product having a boot loader readable by a computer, in which the computer is operative to rewrite a first application program stored in the first memory into a second application program and is accessible to an external unit, the computer having a second memory, the external unit being configured to store therein the second application program and configured to carry out anyone of:
 a first procedure to thereby: send a rewrite control program stored in the external device as write target data; send an identifier identifying that data subsequent to the sending of the identifier represents the second application program; and send, subsequent to the sending of the identifier, the second application program as the write target data; and
 a second procedure to thereby send the identifier identifying that data subsequent to the sending of the identifier represents the second application program; and send, subsequent to the sending of the identifier, the second application program as the write target data without sending the rewrite control program, the rewrite control program, which is previously stored, allowing the system to rewrite the first application program into the second application program; and
the boot loader comprising:
 first means for instructing the computer to determine whether to receive the identifier sent from the external device;
 second means for instructing the computer to store, in the second memory, the write target data sent from the external device as the rewrite control program when determining that the identifier has not been received; and
 third means for instructing the computer to, when determining that the identifier has been received, identify that the write target data sent from the external device is the second application program, and rewrite the first application program into the second application program sent from the external device as the write target data.

7. A non-transitory computer readable, signal bearing medium tangibly storing the boot loader according to claim 6.

8. A vehicle control unit for controlling a target installed in a vehicle, the vehicle control unit comprising the signal bearing media and the computer according to claim 7, the signal bearing media being readable by the computer.

9. A system with a first memory for rewriting a first application program stored in the first memory into a second application program, the system comprising:
 an external device configured to store therein the second application program and configured to carry out any one of:
  a first procedure to thereby: send, as destination information, a location at which a rewrite control program stored in the external device is to be written; send, as the destination information, an address of the first memory at which the second application program is to be written subsequent to the sending of the rewrite control program; and send subsequent to the sending of the destination information, the second application program as the write data; and
  a second procedure to thereby send, as the destination information, the address of the first memory at which the second application program is to be written; and send, subsequent to the sending of the destination information, the second application program as the write target data without sending the rewrite control program, the rewrite control program, which is previously stored, allowing the system to rewrite the first application program into the second application program; and
 a control unit having a second memory and communicably coupled to the external device, when rewriting the first application program into the second application program, the control unit comprising:
  a receiving unit configured to receive the destination information when the destination information is sent from the external device;
  a determining unit configured to determine whether the destination information indicates the address in the first memory;
  a first identification unit configured to store, in the second memory, the write target data sent from the external device as the rewrite control program when it is determined that the destination information does not indicate the address in the first memory; and
  a second identification unit configured to, when it is determined that the destination information indicates the address in the first memory, identify that the write target data sent from the external device is the second application program, and rewrite the first application program into the second application program sent from the external device as the write target data.

10. A system according to claim 9, the second identification unit is configured to:
 determine whether the rewrite control program has been stored in the second memory after it is determined that the destination information indicates the address in the first memory;
 launch the rewrite control program to rewrite the first application program into the second application program when it is determined that the rewrite control program has been stored in the second memory; and
 identify that the rewrite control program has been stored in one of the first memory and another memory installed in the system when it is determined that the rewrite control program has not been stored in the second memory.

11. A system according to claim 10, wherein the first identification unit is configured to set a flag when it is determined that the destination information does not indicate the address in the first memory, and the second identification unit is configured to determine whether the flag is set after it is determined that the destination information indicates the address in the first memory and to determine that the rewrite control program has been stored in the second memory when it is determined that the flag is set.

12. A system according to claim 11, wherein the first memory is a rewritable nonvolatile memory, and the second memory is a rewritable volatile memory, and the second identification unit is configured to run the rewrite control program stored in the rewritable nonvolatile memory thereon when the rewrite control program has not been stored in the rewritable volatile memory.

13. A system according to claim 11, wherein the first memory is a rewritable nonvolatile memory, and the second memory is a rewritable volatile memory, and the second identification unit is configured to copy the rewrite control program stored in the rewritable nonvolatile memory into the rewritable volatile memory when the rewrite control program has not been stored in the rewritable volatile memory, and to run the rewrite control program stored in the rewritable volatile memory thereon to rewrite the first application program into the second application program.

14. A program product having a boot loader readable by a computer, in which the computer is operative to rewrite a first application program stored in a first memory into a second application program and is accessible to an external unit, the computer having a second memory, the external unit being configured to store therein the second application program and configured to carry out any one of:

a first procedure to thereby: send, as destination information, a location at which a rewrite control program stored in the external device is to be written; send the rewrite control program as write target data; send, as the destination information, an address of the first memory at which the second application program is to be written subsequent to the sending of the rewrite control program; and send, subsequent to the sending of the destination information, the second application program as the write target data; and a second procedure to thereby send, as the destination information, the address of the first memory at which the second application program is to be written; and send, subsequent to the sending of the destination information, the second application program as the write target data without sending the rewrite control program, the rewrite control program, which is previously stored, allowing the computer to rewrite the first application program into the second application program;

the boot loader comprising:

first means for causing the computer to receive the destination information when the destination information is sent from the external device;

second means for causing the computer to determine whether the destination information indicates the address in the first memory;

third means for causing the compute to store, in the second memory, the write target data sent from the external device as the rewrite control program when it is determined that the destination information does not indicate the address in the first memory; and fourth means for causing the computer to, when it is determined that the destination information indicates the address in the first memory, identify that the write target data sent from the external device is the second application program, and rewrite the first application program into the second application program sent from the external device as the write target data.

15. A non-transitory computer readable, signal bearing medium tangibly storing the boot loader according to claim 14.

16. A vehicle control unit for controlling a target installed in a vehicle, the vehicle control unit comprising the signal bearing media and the computer according to claim 15, the signal bearing media being readable by the computer.

* * * * *

UNITED STATES PATENT AND TRADEMARK OFFICE
CERTIFICATE OF CORRECTION

| | | |
|---|---|---|
| PATENT NO. | : 7,904,896 B2 | Page 1 of 1 |
| APPLICATION NO. | : 11/298574 | |
| DATED | : March 8, 2011 | |
| INVENTOR(S) | : Yamaguchi | |

It is certified that error appears in the above-identified patent and that said Letters Patent is hereby corrected as shown below:

IN THE CLAIMS:

At col. 25, line 29, Claim 6, after the word "send", insert the following:

--, to the computer,--

At col. 25, line 35, Claim 6, after the word "data" insert the following:

--to the computer--

At col. 25, line 36, Claim 6, after the word "send", insert the following:

--, to the computer,--

At col. 25, line 40, Claim 6, after the word "data", insert the following:

--to the computer--

At col. 26, line 6, Claim 9, before the word "send", insert the following:

--send the rewrite control program as write target data;--

Signed and Sealed this
Fourteenth Day of June, 2011

David J. Kappos
*Director of the United States Patent and Trademark Office*